(12) United States Patent
Katayama

(10) Patent No.: US 7,710,849 B2
(45) Date of Patent: May 4, 2010

(54) OPTICAL HEAD DEVICE AND OPTICAL INFORMATION RECORDING OR REPRODUCING DEVICE

(75) Inventor: Ryuichi Katayama, Tokyo (JP)

(73) Assignee: NEC Corporation, Tokyo (JP)

( * ) Notice: Subject to any disclaimer, the term of this patent is extended or adjusted under 35 U.S.C. 154(b) by 1282 days.

(21) Appl. No.: 11/149,130

(22) Filed: Jun. 10, 2005

(65) Prior Publication Data
US 2005/0274870 A1 Dec. 15, 2005

(30) Foreign Application Priority Data
Jun. 14, 2004 (JP) ............................. 2004-175374

(51) Int. Cl.
*G11B 7/00* (2006.01)
(52) U.S. Cl. .............................. 369/112.16; 369/112.05
(58) Field of Classification Search ............ 369/109.02, 369/112.01, 112.03, 112.04, 112.07, 112.12, 369/112.16
See application file for complete search history.

(56) References Cited

U.S. PATENT DOCUMENTS

| | | | | |
|---|---|---|---|---|
| 5,687,153 | A * | 11/1997 | Komma et al. | 369/112.12 |
| 6,366,542 | B1 * | 4/2002 | Kojima et al. | 369/44.23 |
| 6,859,428 | B2 * | 2/2005 | Mizuno et al. | 369/112.01 |
| 7,260,033 | B2 * | 8/2007 | Shimano et al. | 369/44.37 |
| 2003/0107979 | A1 * | 6/2003 | Kim et al. | 369/112.07 |
| 2003/0123371 | A1 * | 7/2003 | Nishiyama et al. | 369/112.17 |
| 2003/0227859 | A1 * | 12/2003 | Hirai | 369/112.12 |
| 2004/0008603 | A1 * | 1/2004 | Saitoh et al. | 369/99 |
| 2004/0246873 | A1 * | 12/2004 | Maruyama et al. | 369/112.03 |

FOREIGN PATENT DOCUMENTS

| | | |
|---|---|---|
| JP | 05-100114 | 4/1993 |
| JP | 2001-290017 | 10/2001 |
| JP | 2002-170272 | 6/2002 |
| JP | 2003-196860 | 7/2003 |
| JP | 2004-069977 | 3/2004 |
| JP | 2004-354539 | 12/2004 |
| WO | WO 2004/044905 | 5/2004 |

OTHER PUBLICATIONS

Japanese Office Action with English Translations.

* cited by examiner

*Primary Examiner*—Thang V Tran
*Assistant Examiner*—Thomas D Alunkal
(74) *Attorney, Agent, or Firm*—Whitham Curtis Christofferson & Cook, PC

(57) ABSTRACT

Provided is an optical head device and an optical information recording or reproducing device for performing recording or reproduction to/from a plurality of types of optical recording medium, which can obtain a stable track error signal by a small size and exhibits high efficiency. Light $P_D$ and light $P_C$ emitted from a double-wavelength light source make incidence to a diffractive optical element in the same polarization directions. Diffraction gratings have a double refractive characteristic and in these areas the polarization directions of the two light beams become orthogonal. The light of 650 nm band is divided into 0th-order light and ±1st-order diffracted light in one of the diffraction grating and transmits through the other diffraction grating. The light of 780 nm band transmits through one of the diffraction grating and is divided into 0th-order light and ±1st-order diffracted light in the other diffraction grating. The two light beams are emitted from the diffractive optical element in the same polarization direction and guided towards the optical recording medium through a polarizing beam splitter and a quarter-wave plate.

6 Claims, 17 Drawing Sheets

FIG. 2 PRIOR ART
(a)
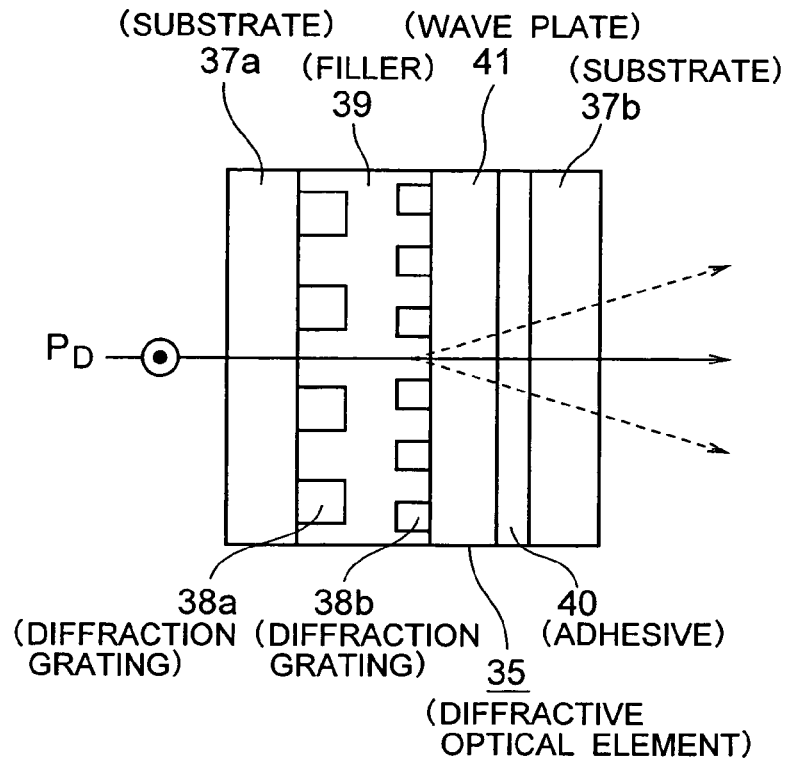
(b)
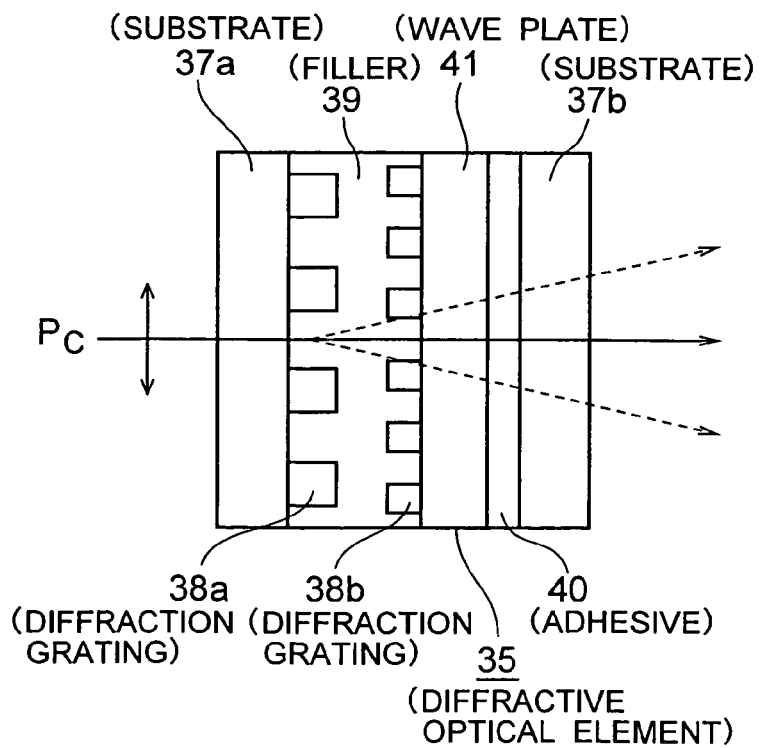

FIG. 4
(a)
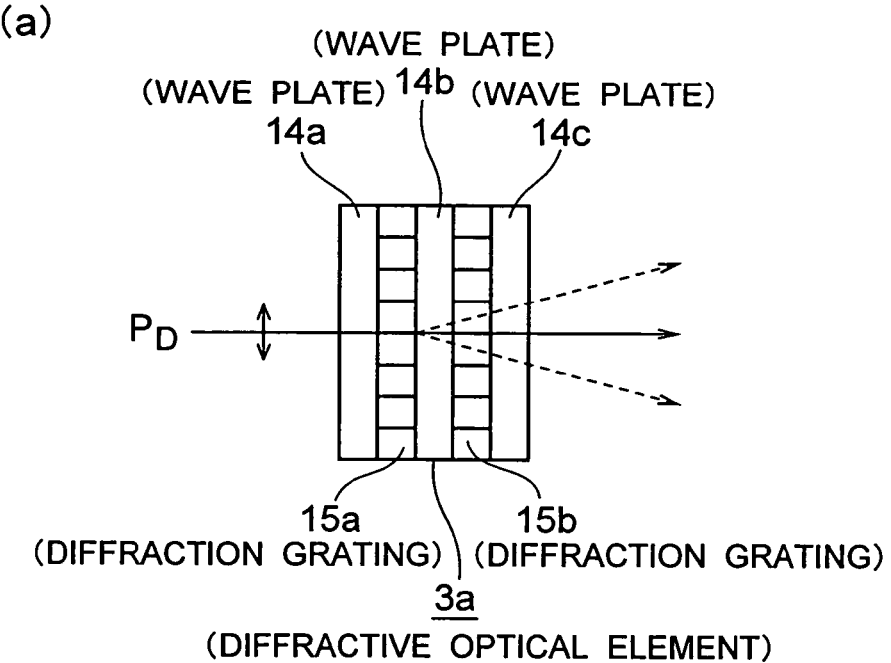
(b)
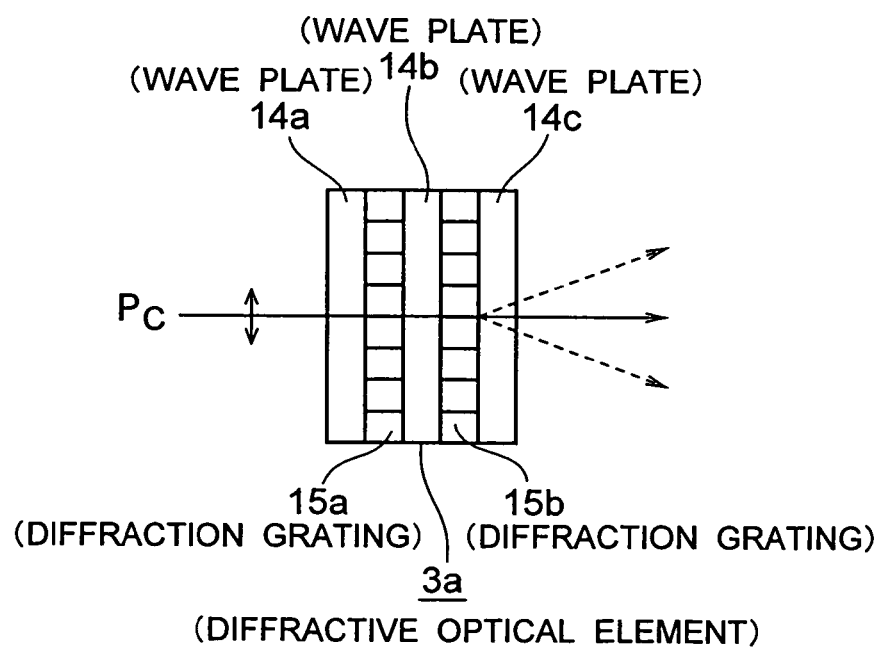

FIG. 6
(a)
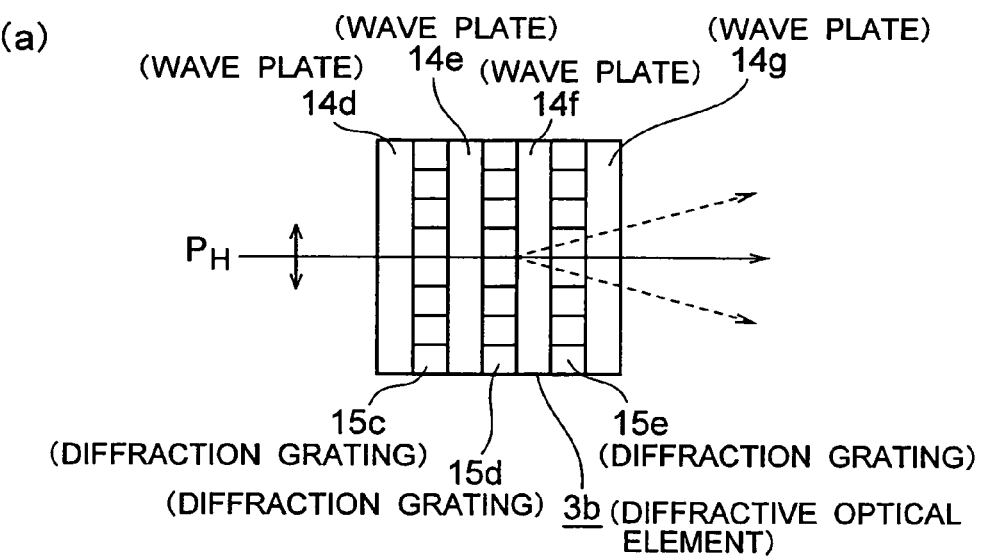
(b)
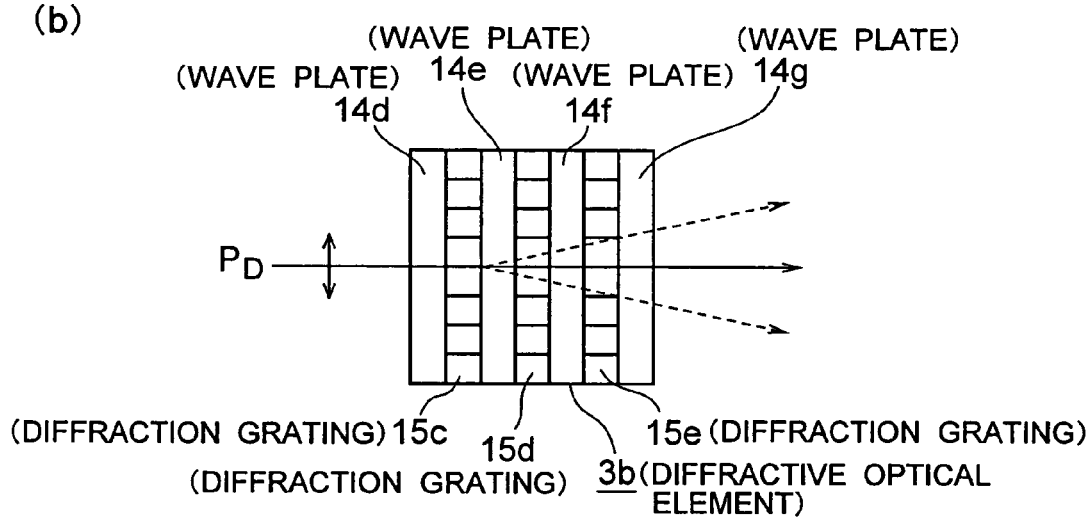
(c)
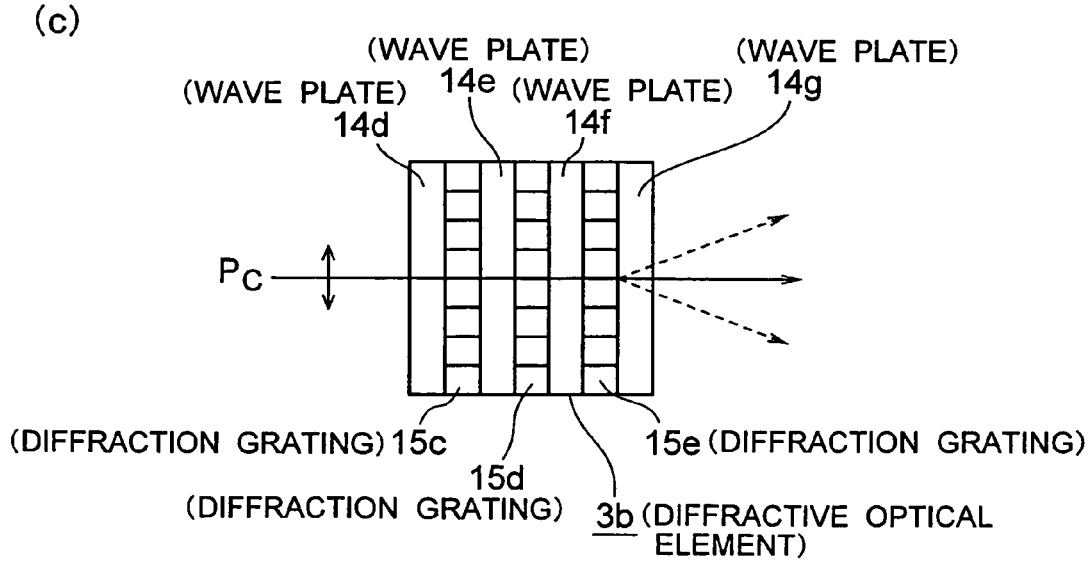

FIG. 7
(a)
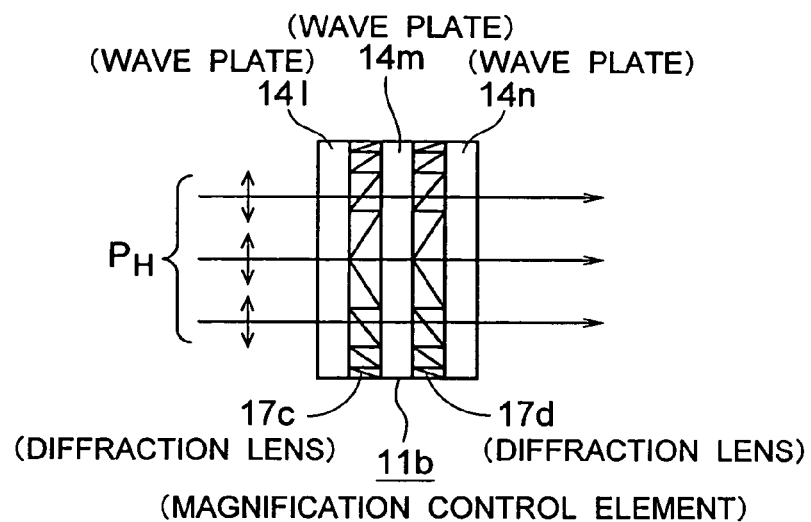
(b)
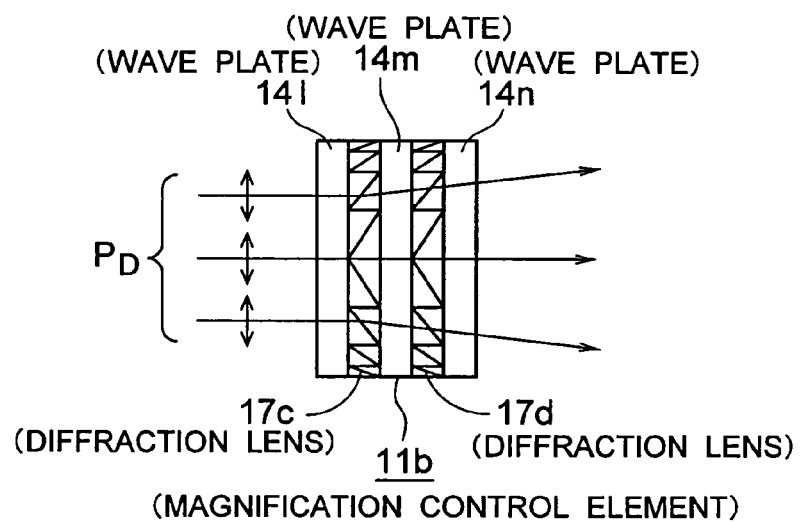
(c)
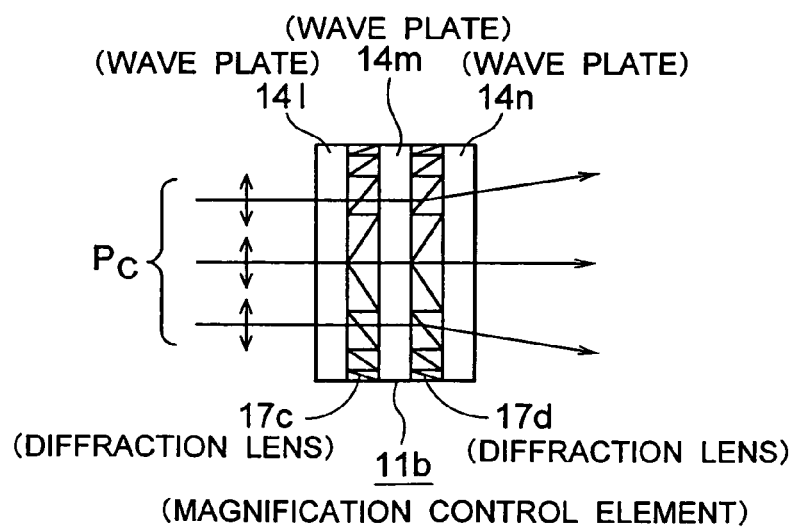

FIG. 8
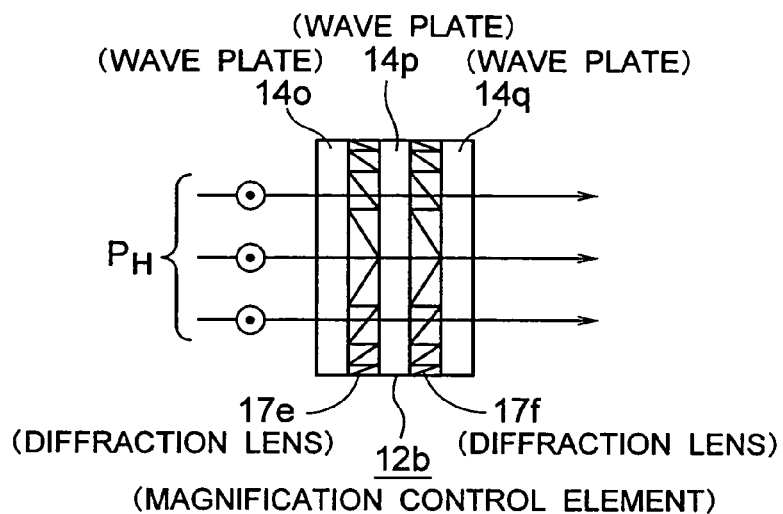
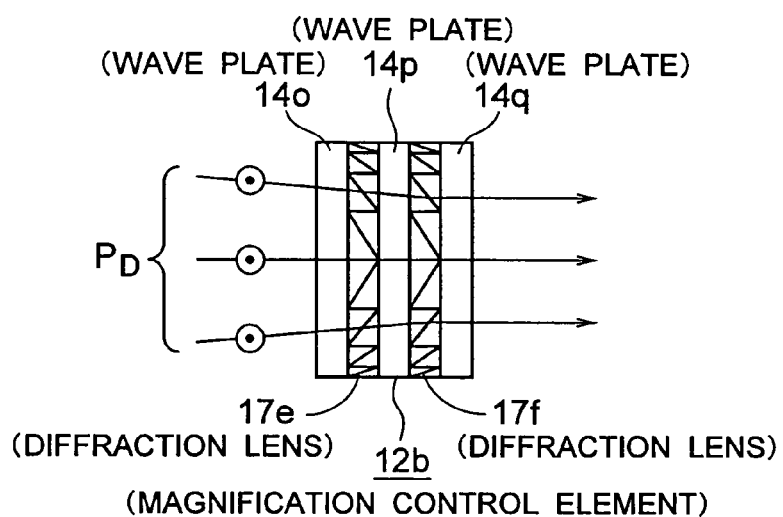
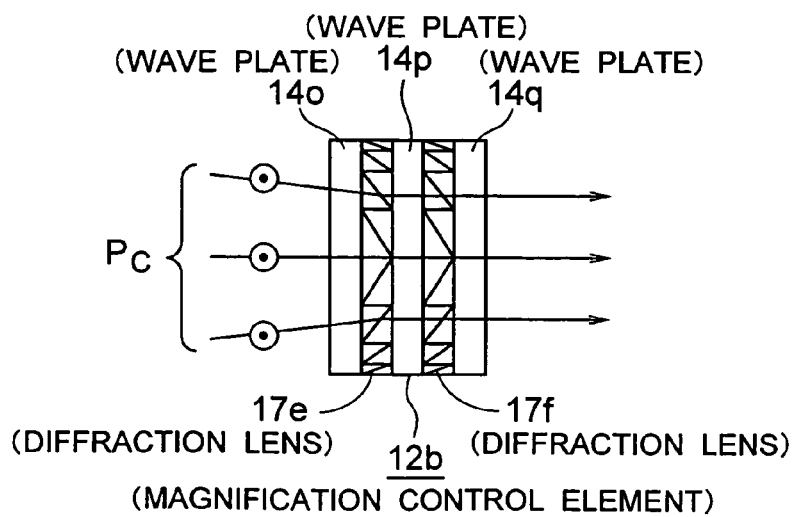

FIG. 9
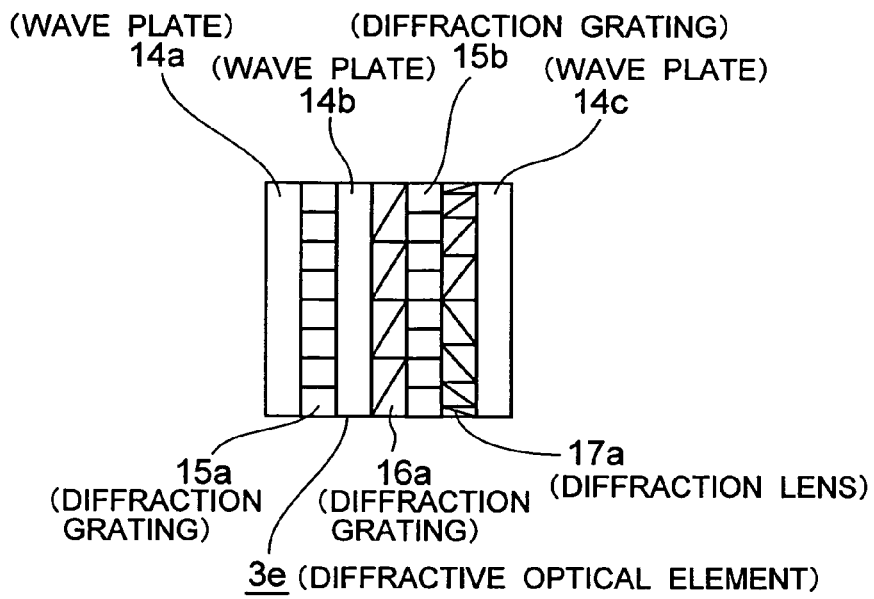
[2]
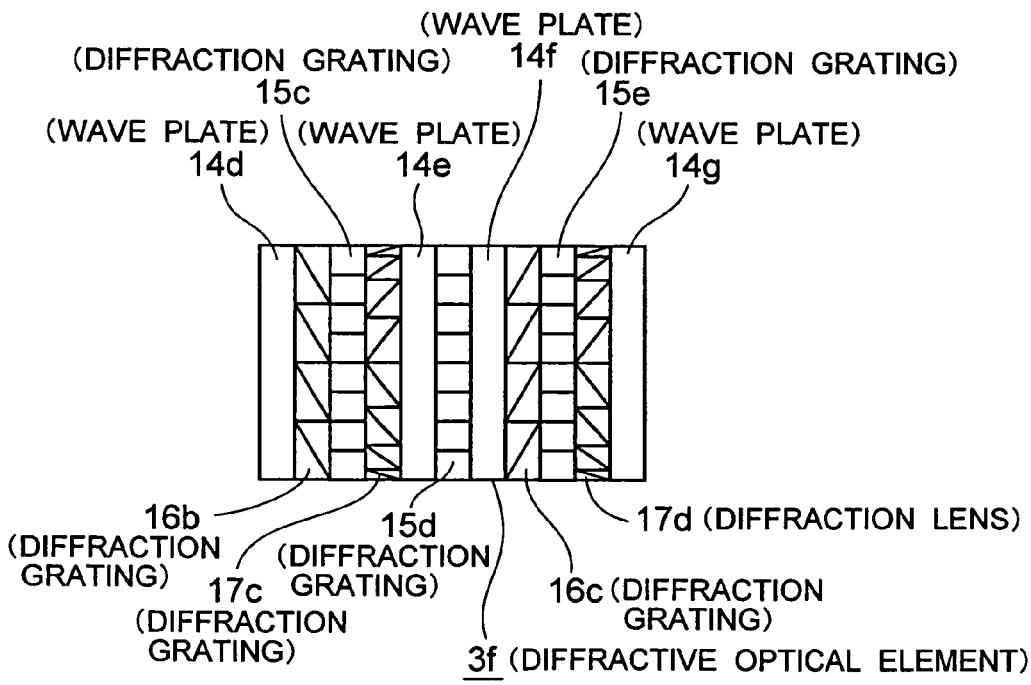

FIG.10
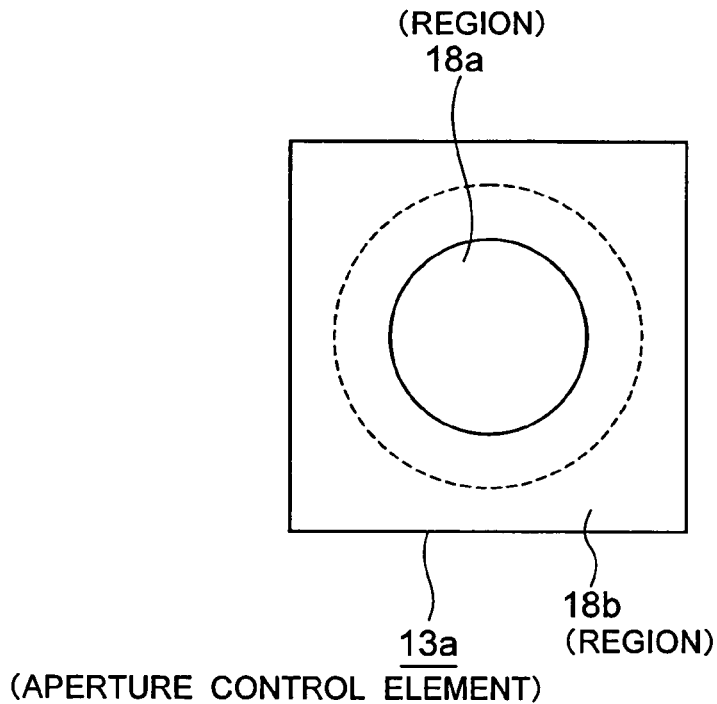
[2]
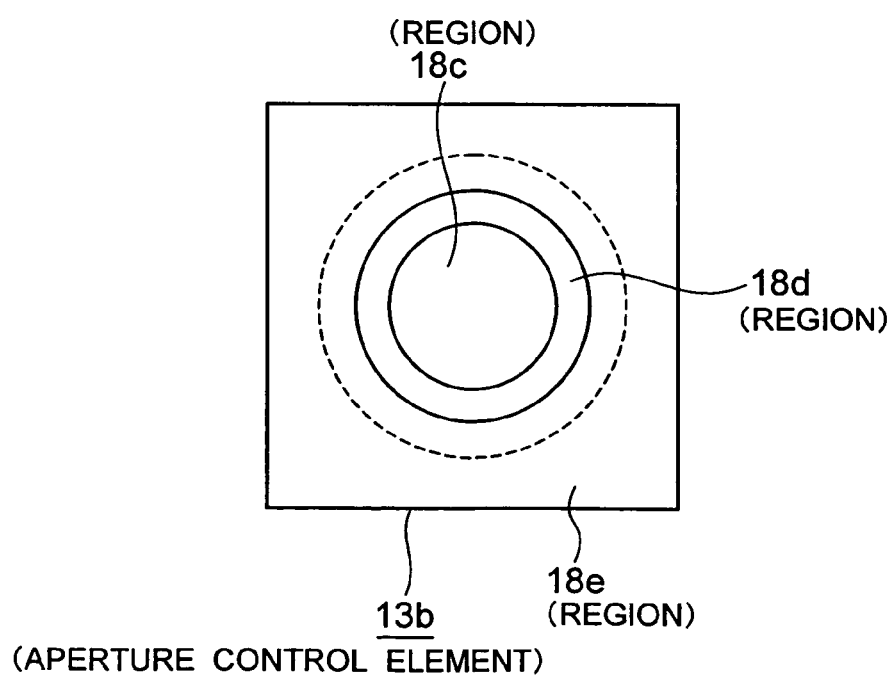

FIG.13
(a)
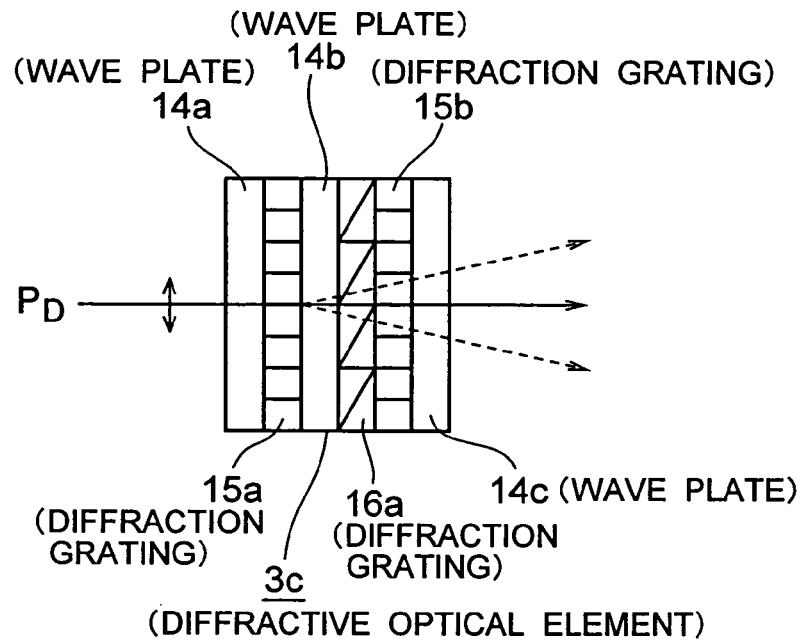
(b)
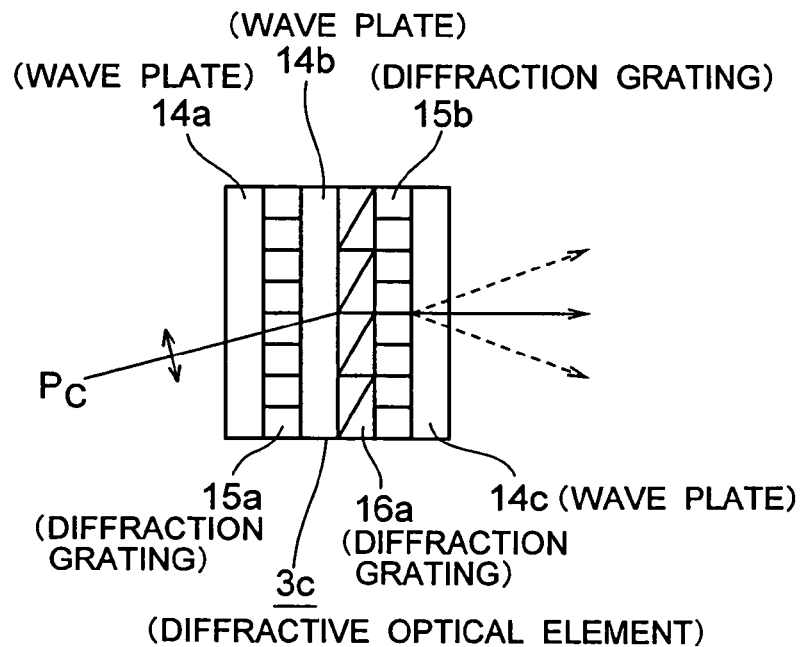

FIG.17
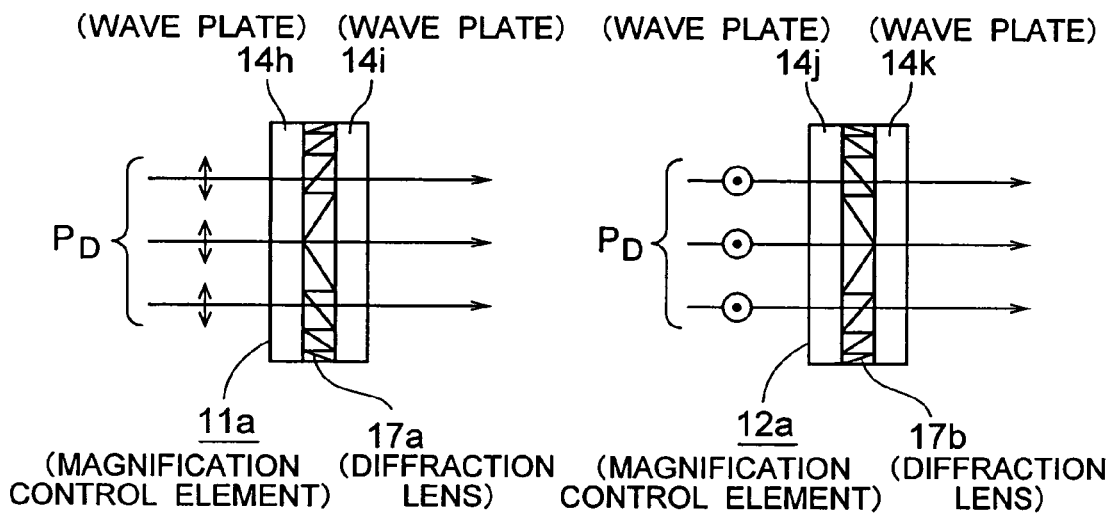
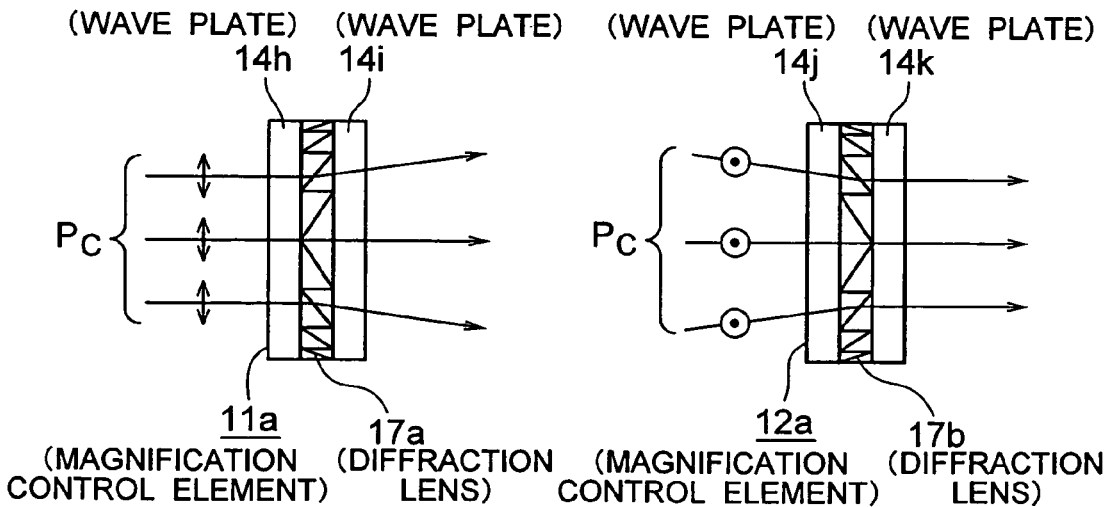

OPTICAL HEAD DEVICE AND OPTICAL INFORMATION RECORDING OR REPRODUCING DEVICE

BACKGROUND OF THE INVENTION

1. Field of the Invention

The present invention relates to an optical head device and an optical information recording or reproducing device for performing recording or reproduction to/from a plurality of types of optical recording medium and, more specifically, to an optical head device and an optical information recording or reproducing device, which can achieve a stable track error signal by small size and also exhibits high efficiency. In the followings, light of 400 nm band wavelength for HD DVD is referred to as light $P_H$, light of 650 nm band wavelength for DVD as light $P_D$, and light of 780 nm band wavelength for CD as light $P_C$.

2. Description of the Related Art

Optical head devices which perform recording and reproduction to/from a plurality of types of optical recording medium of different standards such as DVD (Digital Versatile Disk) and CD (Compact Disk) have been put into practical use. However, the recording or reproducing characteristics for the optical recording medium of a specific standard are guaranteed only for a specific wavelength. That is, the recording or reproducing characteristics for the optical recording medium of DVD standard are guaranteed only for the light $P_D$, and the recording or reproducing characteristics for the optical recording medium of CD standard are guaranteed only for the light $P_C$.

Therefore, in general, the optical head device which performs recording and reproduction to/from a plurality of types of optical recording medium of different standards comprises a plurality of numbers of light sources being mounted for outputting the light of wavelengths corresponding to each standard. For example, the optical head device which performs recording and reproduction to/from both the optical recording medium of DVD standard and the optical recording medium of CD standard is provided with a light source for emitting the light $P_D$ and a light source for emitting the light $P_C$.

In general, each of these two light sources is housed in a separate package. However, a double-wavelength light source in which two light sources are housed in a common package has also been put into practical use. By using such double-wavelength light source for the optical system of the optical head device, it becomes unnecessary to provide a photosynthesizing device for synthesizing light emitted from two light sources housed in separate packages. Thus, size of the optical system of the optical head device can be reduced.

Known as a method for detecting a track error signal in the optical head device is a differential push-pull method. With the differential push-pull method, there is no offset generated in the track error signal even if an objective lens of the optical head device shifts in a radial direction of the optical recording medium thereby enabling to attain a stable track error signal. This detection method can be achieved through dividing the emitted light from the light source into 0th-order light as a main beam and ±1st-order diffracted light as sub-beams by a diffractive optical element provided between the light source and the objective lens of the optical head device. These three beams of light are reflected by the optical recording medium and separately received by a photodetector of the optical head device. In the differential push-pull method, the track error signal is attained by finding a difference between a push-pull signal of the main beam and push-pull signals of the sub-beams received by the photodetector. The ratio of light quantities of the main beam and the sub-beams is determined by the groove depth of a diffraction grating of the diffractive optical element. The space between the main beam and the sub-beams on the optical recording medium is determined by a groove cycle of the diffraction grating of the diffractive optical element.

Now, let's look into the case of detecting the track error signal using the above-described diffractive optical element for each of the optical recording medium of the DVD standard and the optical recording medium of the CD standard in the optical head device which performs recording and reproduction to both the optical recording medium of the DVD standard and the optical recording medium of the CD standard.

When using two light sources for DVD and CD being housed in the separate packages for the optical system of the optical head device, in general, a diffractive optical element for DVD is disposed on an exclusive optical path of the light $P_D$ and a diffractive optical element for CD is disposed on an exclusive optical path of the light $P_C$. By individually setting the groove depth and the cycles of the diffraction gratings of the respective diffractive optical elements, the ratio of the light quantities of the main beam and the sub-beams and the space therebetween on the optical recording medium can be set individually for the light $P_D$ and the light $P_C$.

In the meantime, when using the double-wavelength light source for DVD and CD housed in a common package for the optical system of the optical head device, the diffractive optical element compatible for double wavelengths of DVD and CD has to be disposed on a common optical path of the light $P_D$ and the light $P_C$. Thus, for individually setting the ratio of the light quantities of the main beam and the sub-beams and the space therebetween on the optical recording medium for the light $P_D$ and the light $P_C$, some contrivances are necessary in the diffractive optical element which is compatible for double wavelengths.

Japanese Patent Unexamined Publication No. 2001-290017 discloses such an optical head device which uses the double-wavelength light source and the diffractive optical element compatible for double wavelengths as described above. FIG. 1 shows the optical head device disclosed in Japanese Patent Unexamined Publication No. 2001-290017. A semiconductor laser 1a is obtained by housing a semiconductor laser for emitting the light $P_D$ and a semiconductor laser for emitting the light $P_C$ in a common package.

The light $P_D$ emitted from the semiconductor laser 1a is divided into three light beams by a diffractive optical element 35 which are 0th-order light as a main beam and ±1st-order diffracted lights as sub-beams. A part of these light beams transmits through the non-polarizing beam splitter 36, collimated by a collimator lens 2, and is focused onto a disk 7 as an optical recording medium of the DVD standard by an objective lens 6. The three light beams reflected by the disk 7 transmits through the objective lens 6 and the collimator lens 2 in the reverse direction and a part of which is reflected by the beam splitter 36 and received by a photodetector 10a.

The light $P_C$ emitted from the semiconductor laser 1a is divided into three light beams by a diffractive optical element 35 which are 0th-order light as a main beam and ±1st-order diffracted lights as sub-beams. A part of these light beams transmits through a non-polarizing beam splitter 36, collimated by a collimator lens 2, and is focused onto the disk 7 as an optical recording medium of the CD standard by the objective lens 6. The three light beams reflected by the disk 7 transmits through the objective lens 6 and the collimator lens 2 in the reverse direction and a part of which is reflected by the beam splitter 36 and received by the photodetector 10a.

FIG. 2 is a cross section of the diffractive optical element 35. The diffractive optical element 35 has a configuration in which: a diffraction grating 38a having a birefringent characteristic is formed on a substrate 37a; a diffraction grating 38b having a birefringent characteristic is formed on a wave plate 41; a filler 39 is filled in between the diffraction grating 38a and the diffraction grating 38b; and the wave plate 41 and the substrate 37a are bonded by an adhesive 40. Here, the linearly polarized light whose polarization direction is parallel to the grooves of the diffraction gratings 38a, 38b is referred to as TE-polarized light and the linearly polarized light whose polarization direction is vertical to the grooves of the diffraction gratings 38a, 38b is referred to as TM-polarized light. At this time, the refractive index of the diffraction grating 38a is equal to the refractive index of the filler 39 for the TE-polarized light and is different from the refractive index of the filler 39 for the TM-polarized light. Further, the refractive index of the diffraction grating 38b is different from the refractive index of the filler 39 for the TE-polarized light and is equal to the refractive index of the filler 39 for the TM-polarized light. That is, the diffraction grating 38a functions as the diffraction grating only for the TM-polarized light and the diffraction grating 38b functions as the diffraction grating only for the TE-polarized light.

As shown in FIG. 2(a), the light $P_D$ makes incidence to the diffraction gratings 38a, 38b as the TE-polarized light. Thus, the light $P_D$ almost entirely transmits through the diffraction grating 38a and is divided into three light beams, i.e. 0th-order light as the main beam and the ±1st-order diffracted light as the sub-beams by the diffraction grating 38b. The ratio of light quantities of the main beam and the sub-beams is determined by the groove depth of the diffraction grating 38b and the space between the main beam and the sub-beams on the optical recording medium is determined by the groove cycle of the diffraction grating 38b.

As shown in FIG. 2(b), the light $P_C$ makes an incident to the diffraction gratings 38a, 38b as the TM-polarized light. Thus, the light $P_C$ is divided into three light beams, i.e. 0th-order light as the main beam and the ±1st-order diffracted light as the sub-beams by the diffraction grating 38a and almost entirely transmits through the diffraction grating 38b. The ratio of light quantities of the main beam and the sub-beams is determined by the groove depth of the diffraction grating 38a and the space between the main beam and the sub-beams on the optical recording medium is determined by the groove cycle of the diffraction grating 38a.

In the manner as described above, the ratio of the light quantities of the main beam and the sub-beams and the space therebetween on the optical recording medium can be individually set for the light $P_D$ and the light $P_C$. The wave plate 41 functions as a quarter-wave plate for the light $P_D$. Thus, in FIG. 2(a), the light emitted from the diffractive optical element 35 becomes a circularly polarized light. Further, in FIG. 2(b), the light emitted from the diffractive optical element 35 becomes an elliptically polarized light in general.

In an optical head device shown in FIG. 1, for example, for obtaining the maximum product of the efficiency of the inward light emitted from the semiconductor laser 1a towards the disk 7 through the beam splitter 36 and the efficiency of the outward light towards the photodetector 10a reflected by the disk 7 and the beam splitter 36, the transmittivity and the reflectivity of the beam splitter 36 are both to be 50%. That is, when the non-polarizing beam splitter 36 is used as a light separating element for separating the inward light and the outward light, there generates 50% loss in the light quantities generated both in the inward and outward light. In order to suppress the loss of the light quantity in the inward and outward light, generally used as the light separating element is a combination of a polarizing beam splitter and a quarter-wave plate.

However, even if the beam splitter 36 of the optical head device shown in FIG. 1 is replaced with the combination of the polarizing beam splitter and the quarter-wave plate, loss in the light quantity of the outward light cannot be suppressed. The reason is that the light $P_D$ for DVD makes incidence to the polarizing beam splitter as a circularly polarized light so that only about 50% of the light is transmitted, and the light $P_C$ for the CD generally makes incidence to the polarizing beam splitter as an elliptically polarized light so that the light is not transmitted by 100%.

As described above, in the optical head device disclosed in Japanese Patent Unexamined Publication No. 2001-290017 and the optical head device in which a part of the optical system is modified, the optical system can be reduced in size by using the double-wavelength light source for the optical system, and the ratio of the light quantities of the main beam and the sub-beams and the space therebetween on the optical recording medium can be individually set for the light of the respective wavelength. Thus, it is possible to attain a stable track error signal by the differential push-pull method. However, loss of the light quantity in the inward and outward light cannot be suppressed so that the efficiency is low.

SUMMARY OF THE INVENTION

An object of the present invention is to overcome the aforementioned shortcomings of the conventional optical head device which performs recording and/or reproduction to/from a plurality of types of optical recording medium and to provide an optical head device and an optical information recording or reproducing device which can attain a stable track error signal by small size and exhibit high efficiency.

The optical head device according to the present invention comprises: a plural-wavelength light source capable of selectively emitting a single light beam among a plurality of light beams of different wavelengths; an objective lens for focusing emitted light from the plural-wavelength light source onto an optical recording medium; a photodetector for receiving reflected light from the optical recording medium; a light separating element for separating the emitted light from the plural-wavelength light source and the reflected light from the optical recording medium; and a diffractive optical element provided between the plural-wavelength light source and the light separating element, the diffractive optical element branching the emitted light from the plural-wavelength light source into a plurality of light beams. The light separating element includes a polarizing beam splitter which guides the emitted light from the diffractive optical element to the optical recording medium and also guides the reflected light from the optical recording medium to the photodetector. Also, among a plurality of the light beams of different wavelengths making incidence to the polarizing beam splitter, at least two light beams (preferably all) are linearly polarized light with a same polarization direction.

If the light making incidence to the polarizing beam splitter is the linearly polarized light, it can be guided from the diffractive optical element to the optical recording medium or from the optical recording medium to the photodetector with smaller loss compared to the case of the circularly polarized light and elliptically polarized light. Furthermore, if the polarization directions of the linearly polarized light are consistent for a plurality of the light beams of different wavelengths, a plurality of the light beams of different wavelengths are unified either to transmit or to be reflected when making incidence to the polarizing beam splitter. Thus, the structure of the optical system becomes simple.

Further, the following structural elements may be added to the optical head device of the present invention. The diffractive optical element has a structure in which a plurality of wave plates and a plurality of diffraction gratings are laminated. At this time, among a plurality of the light beams of different wavelengths making incidence to an arbitrary diffraction grating among a plurality of the diffraction gratings, a polarization direction of one of the light beams is orthogonal to a polarization direction of other light beams. At this time, the arbitrary diffraction grating may branch one light beam into a plurality of light beams and transmit the other light beams. At this time, a plurality of the diffraction gratings may contain a material having a birefringent characteristic. Also, the diffractive optical element may further comprise a diffraction grating for optical axis correction, which is provided adjacent to the arbitrary diffraction grating so as to deflect one light beam by diffraction and transmit the other light beams. At this time, the diffraction grating for optical axis correction may contain a material having a birefringent characteristic.

Moreover, the optical head device according to the present invention may further comprises: a first magnification control element provided between the plural-wavelength light source and the light separating element so as to alter magnification of the objective lens in an inward path in accordance with a wavelength of incident light; and a second magnification control element provided between the light separating element and the photodetector so as to alter magnification of the objective lens in an outward path in accordance with a wavelength of incident light. At this time, the following structural elements may be added. Each of the first magnification control element and the second magnification control element has a structure in which a plurality of wave plates and a diffraction lens are laminated. At this time, among a plurality of the light beams of different wavelengths making incidence to the diffraction lens, a polarization direction of one of the light beams is orthogonal to the polarization direction of other light beams. At this time, the diffraction lens may give a lens effect to the one light beam by diffraction and transmit the other light beams. At this time, the diffraction lens may contain a material having a birefringent characteristic. Further, the diffractive optical element and the first magnification control element may be unified.

Further, the optical head device of the present invention comprises: a plural-wavelength light source having a plurality of light sources of different wavelengths; an objective lens for focusing emitted light from the plural-wavelength light source onto an optical recording medium; a photodetector for receiving reflected light from the optical recording medium; a light separating element for separating the emitted light from the plural-wavelength light source and the reflected light from the optical recording medium; and a diffractive optical element provided between the plural-wavelength light source and the light separating element, the diffractive optical element branching the emitted light from the plural-wavelength light source into a plurality of light beams, wherein a plurality of light beams of different wavelengths from the diffractive optical element make incidence to the light separating element as linearly polarized light with same polarization directions.

Further, an optical information recording or reproducing device of the present invention comprises: an optical head device, a first circuit for driving the plural-wavelength light source; a second circuit for generating a reproduction signal and an error signal based on an output signal of the photodetector; and a third circuit for controlling position of the objective lens based on the error signal.

In the optical head device and the optical information recording or reproducing device of the present invention, the optical system can be reduced in size by using a plural-wavelength light source. Also, by using the diffractive optical element containing a material with a double refractive characteristic, it becomes possible to set the ratio of light quantities of the main beam and the sub-beams and the space therebetween on the optical recording medium individually for a plurality of light beams of different wavelengths. Thus, it is possible to obtain a stable error track signal by the differential push-pull method. Further, by using the polarizing beam splitter as the light separating element, the polarization directions of a plurality of the light beams of different wavelengths making incidence to the polarizing beam splitter from the diffractive optical element side can be matched with the polarization direction by which the light making incidence to the polarizing beam splitter from the diffractive optical element side is guided to the optical recording medium side with almost no loss. Thereby, loss of the light quantities of the inwards light and outwards light can be suppressed so that the efficiency is improved.

As has been described above, the effect of the optical head device and the optical information recording or reproducing device of the present invention is that a stable track error signal can be attained by the small-size devices and also the efficiency is high.

The former effect is achieved as follows. The optical system can be reduced in size by using a plural-wavelength light source. Thus, the ratio of the light quantities and the space on the optical recording medium between the main beam and the sub-beam can be individually determined for a plurality of light beams of different wavelengths by using the diffractive optical element containing a material with birefringent characteristic. Therefore, a stable track error signal can be attained by the differential push-pull method.

Further, the latter effect is achieved as follows. By using the polarizing beam splitter as the light separating element, the polarization direction of a plurality of light beams of different wavelengths, which makes incidence to the polarizing beam splitter from the diffractive optical element side, is matched with the polarization direction by which the light making incidence to the polarizing beam splitter from the diffractive optical element side is guided to the optical recording medium side with almost no loss. Thereby, it enables to suppress the loss of the light quantities in the inward light and outward light.

BRIEF DESCRIPTION OF THE DRAWINGS

FIG. 2 illustrates cross sections of a diffractive optical element of the conventional optical head device;

FIG. 4 illustrates cross sections of a diffractive optical element in the first embodiment of the optical head device of the present invention;

FIG. 6 illustrates cross sections of a diffractive optical element in a second embodiment of the optical head device of the present invention;

FIG. 7 illustrates cross sections of a magnification control element in a sixth embodiment of the optical head device of the present invention;

FIG. 8 illustrates cross sections of the magnification control element in the sixth embodiment of the optical head device of the present invention;

FIG. 9 illustrates cross sections of a diffractive optical element in a seventh embodiment of the optical head device of the present invention;

FIG. 10 illustrates plan views of an aperture control element in a fifth embodiment of the optical head device of the present invention;

FIG. 13 illustrates cross sections of a diffractive optical element in a third embodiment of the optical head device of the present invention;

FIG. 17 illustrates cross sections of a magnification control element in the fifth embodiment of the optical head device of the present invention.

DETAILED DESCRIPTION OF THE PREFERRED EMBODIMENTS

Embodiments of the present invention will be described hereinafter by referring to the accompanying drawings.

Figure 1:
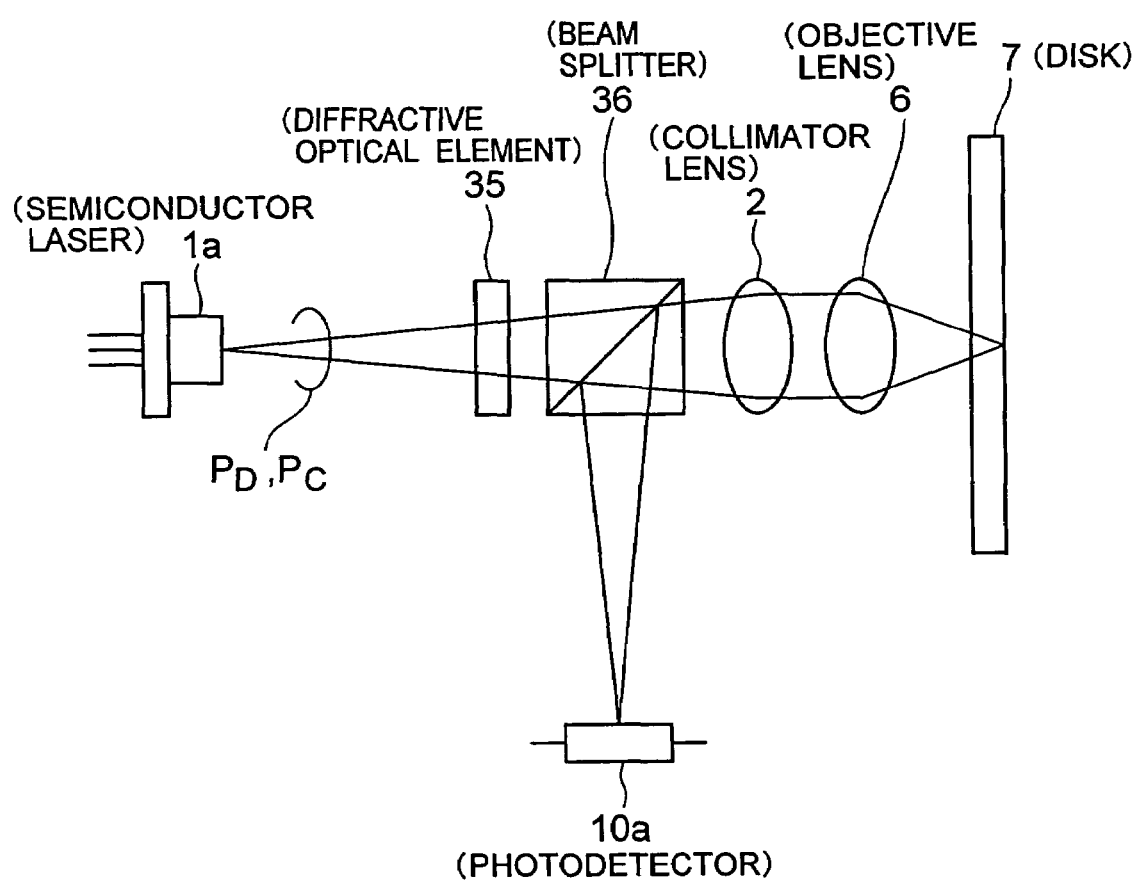
FIG. 1 is an illustration for showing a conventional optical head device.
Figure 3:
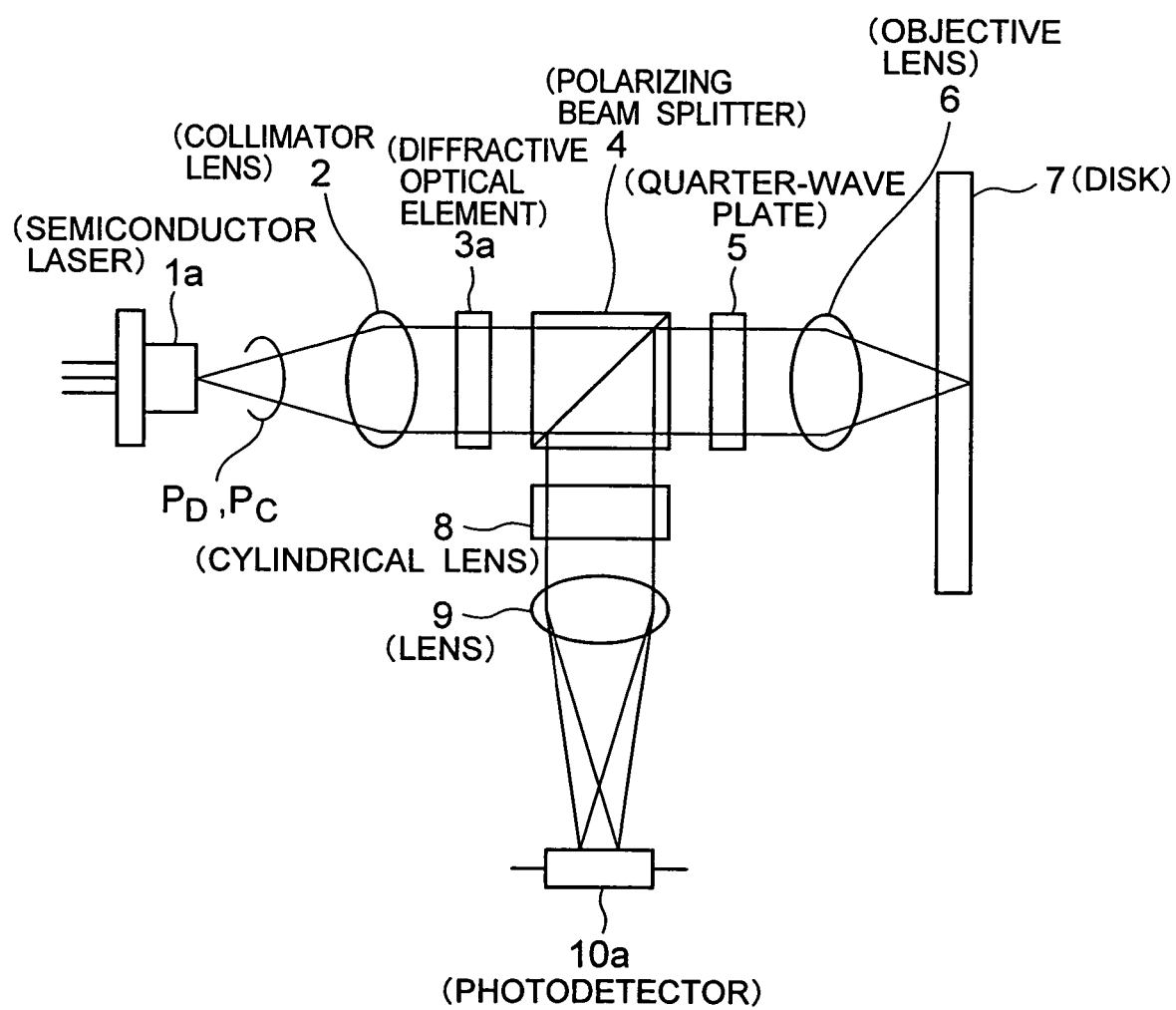
FIG. 3 is an illustration for showing a first embodiment of an optical head device of the present invention.

FIG. 3 shows a first embodiment of an optical head device of the present invention. A semiconductor laser 1a comprises a semiconductor laser for emitting light $P_D$ for DVD and a semiconductor laser for emitting light $P_C$ for CD housed in a common package.

The light $P_D$ emitted from the semiconductor laser 1a is collimated by a collimator lens 2 and divided into three beams of light, i.e. the 0th-order light as the main beam and ±1st-order diffracted light as the sub-beams, by a diffractive optical element 3a. These light beams make incidence to a polarizing beam splitter 4 as P-polarized light and almost 100% transmit therethrough. The light beams transmit through a quarter-wave plate 5 and are converted from the linearly polarized light into circularly polarized light, which are then focused on a disk 7 as an optical recording medium of the DVD standard by an objective lens 6. The three light beams reflected by the disk 7 transmit through the objective lens 6 in the reverse direction and transmit through the quarter-wave plate 5, which are then converted from the circularly polarized light into the linearly polarized light whose polarization direction is orthogonal to the inward light. Then, the light beams make incidence to the polarizing beam splitter 4 as S-polarized light and almost 100% of which are reflected and received in an photodetector 10a after transmitting through a cylindrical lens 8 and a lens 9.

The light $P_C$ emitted from a semiconductor laser 1 is collimated by a collimator lens 2. The collimated light is then divided into three light beams by a diffractive optical element 3a which are 0th-order light as a main beam and ±1st-order diffracted lights as sub-beams. The light beams enter a polarizing beam splitter 4 as P polarized light and substantially 100% transmit therethrough. Then, they transmit through a quarter-wave plate 5 to be converted from linearly polarized light to circularly polarized light thereby to be focused onto a disk 7 by an objective lens 6. Three light beams reflected from the disk 7 transmit inversely through the objective lens 6 and then transmit the quarter-wave plate 5 to be converted from the circularly polarized light to linearly polarized light whose polarization direction is orthogonal to that in the outward path. The light beams then enter the polarizing beam splitter 4 as S polarized light and substantially 100% is reflected thereby to be received by a photodetector 10a through a cylindrical lens 8 and lens 9. The photodetector 10a is placed between the two focal lines of the cylindrical lens 8 and lens 9.

FIG. 4 is a cross section of the diffractive optical element 3a. The diffractive optical element 3a has a structure in which a wave plate 14a, a diffraction grating 15a, a wave plate 14b, a diffraction grating 15b, and a wave plate 14c are laminated. For the wave plates 14a, 14b, and 14c, crystals having a birefringent characteristic can be used or it is also possible to use ones in which liquid crystal high polymer or the like having the birefringent characteristic are sandwiched by glass substrates. For the diffraction gratings 15a and 15b, it is possible to use the one obtained by forming a pattern of the liquid crystal high polymer or the like having the birefringent characteristic on one of the wave plates 14a, 14b, 14c and then filled with filler. It is also possible to use the one obtained by forming a pattern of the liquid crystal high polymer or the like having the birefringent characteristic on a glass substrate and then filled with filler. The plane shape of the pattern of the liquid crystal high polymer or the like is in a straight line form at equal intervals and the cross section is in a rectangular shape. The wave plate 14a, the diffraction grating 15a, the wave plate 14b, the diffraction grating 15b, and the wave plate 14c are integrated with an adhesive provided in between as necessary.

The wave plate 14a functions as a full wave plate for the light $P_D$ and functions as a half-wave plate for the light $P_C$ for converting the polarization direction of the incident light by 90°. This can be achieved by setting the phase difference by the wave plate 14a to be a multiple of integers of $2\pi$ for the light $P_D$ and to be a multiple of odd numbers of $\pi$ for the light $P_C$. For example, if the phase difference by the wave plate 14a is $2\pi/\lambda \times 2000$ nm ($\lambda$ is the wavelength of the incident light), the phase difference when $\lambda=650$ nm becomes $2\pi \times 3.08$. Thus, the phase difference when $\lambda=780$ nm becomes $\pi \times 5.13$, which substantially satisfies the above-described conditions.

The wave plate 14b functions as a wideband half-wave plate for the light $P_D$ and the light $P_C$ for converting the polarization direction of the incident light by 90°. For example, Japanese Patent Unexamined Publication No. 5-100114 discloses such wideband half-wave plate.

The wave plate 14c functions as a half-wave plate for the light $P_D$ for converting the polarization direction of the incident light by 90° and functions as a full wave plate for the light $P_C$. This can be achieved by setting the phase difference by the wave plate 14c to be a multiple of odd numbers of $\pi$ for the light $P_D$ and to be a multiple of integers of $2\pi$ for the light $P_C$. For example, if the phase difference by the wave plate 14c is $2\pi/\lambda \times 1600$ nm ($\lambda$ is the wavelength of the incident light), the phase difference when $\lambda=650$ nm becomes $\pi \times 4.92$. Thus, the phase difference when $\lambda=780$ nm becomes $2\pi \times 2.05$, which substantially satisfies the above-described conditions. That is, the wave plates 14a, 14b, 14c function as the full wave plate→half-wave plate→half-wave plate for the light $P_D$ and function as the half-wave plate→half-wave plates→full wave plate for the light $P_C$.

The direction of the grooves of the diffraction gratings 15a, 15b is the direction vertical to the face of the page of the drawing. The linearly polarized light whose polarization direction is parallel to the grooves of the diffraction gratings 15a, 15b, i.e. the linearly polarized light vertical to the face of the page of the drawing, is TE-polarized light, and the linearly polarized light whose polarization direction is vertical to the grooves of the diffraction gratings 15a, 15b, i.e. the linearly polarized light parallel to the face of the page of the drawing, is TM-polarized light. At this time, the refractive index of the liquid crystal high polymer or the like in the diffraction gratings 15a, 15b is the same as the refractive index of the filler for the TE-polarized light and is different from the refractive index of the filler for the TM-polarized light. That is, the diffraction gratings 15a and 15b function as the diffraction gratings only for the TM-polarized light.

FIG. 4 (a) shows the light $P_D$ for DVD. The light $P_D$ makes incidence to the diffractive optical element 3a as the TM-polarized light. This light as the TM-polarized light transmits through the wave plate 14a as it is and makes incidence to the diffraction grating 15a. Thus, it is divided into three light beams of 0th-order light as the main beam and ±1st-order diffracted light as the sub-beams in the diffraction grating 15a. The ratio of light quantities of the main beam and the sub-beam is determined by the groove depth of the diffraction grating 15a and the space between the main beam and the sub-beams on the optical recording medium is determined by the groove cycle of the diffraction grating 15a. These light beams transmit through the wave plate 14b and converted from the TM-polarized light into the TE-polarized light to make incidence to the diffraction grating 15b. Therefore, almost the entire light beams transmit through the diffraction grating 15b. These light beams transmit through the wave plate 14c and converted from the TE-polarized light into the TM-polarized light to be outputted from the diffractive optical element 3a as the TM-polarized light.

FIG. 4(b) shows the light $P_C$ for CD. The light $P_C$ makes incidence to the diffractive optical element 3a as the TM-polarized light. This light transmits through the wave plate 14a and converted from the TM-polarized light into the TE-polarized light to make incidence to the diffraction grating 15a. Thus, it transmits through the diffraction grating 15a almost entirely. This light transmits through the wave plate 14b and converted from the TE-polarized light into the TM-polarized light to make incidence to the diffraction grating 15b. Therefore, it is divided into three light beams of 0th-order light as the main beam and ±1st-order diffracted light as the sub-beams in the diffraction grating 15b. The ratio of light quantities of the main beam and the sub-beam is determined by the groove depth of the diffraction grating 15b and the space between the main beam and the sub-beam on the optical recording medium is determined by the groove cycle of the diffraction grating 15b. These light beams as the TM-polarized light transmit through the wave plate 14c in that state and emitted from the diffractive optical element 3a as the TM-polarized light.

As described above, in the embodiment, the optical system can be reduced in size by using the double-wavelength light source for DVD and CD for the optical system and the ratio of the light quantities of the main beam and the sub-beams and the space therebetween on the optical recording medium can be individually determined for the light $P_D$ and the light $P_C$. Therefore, it is possible to attain a stable track error signal by the differential push-pull method. Furthermore, loss of the light quantities in the inward light and the outward light can be suppressed by matching the direction of the TM-polarized light in the diffractive optical element 3a and the direction of the P-polarized light in the polarizing beam splitter 4. Thus, the efficiency becomes high.

Figure 5:
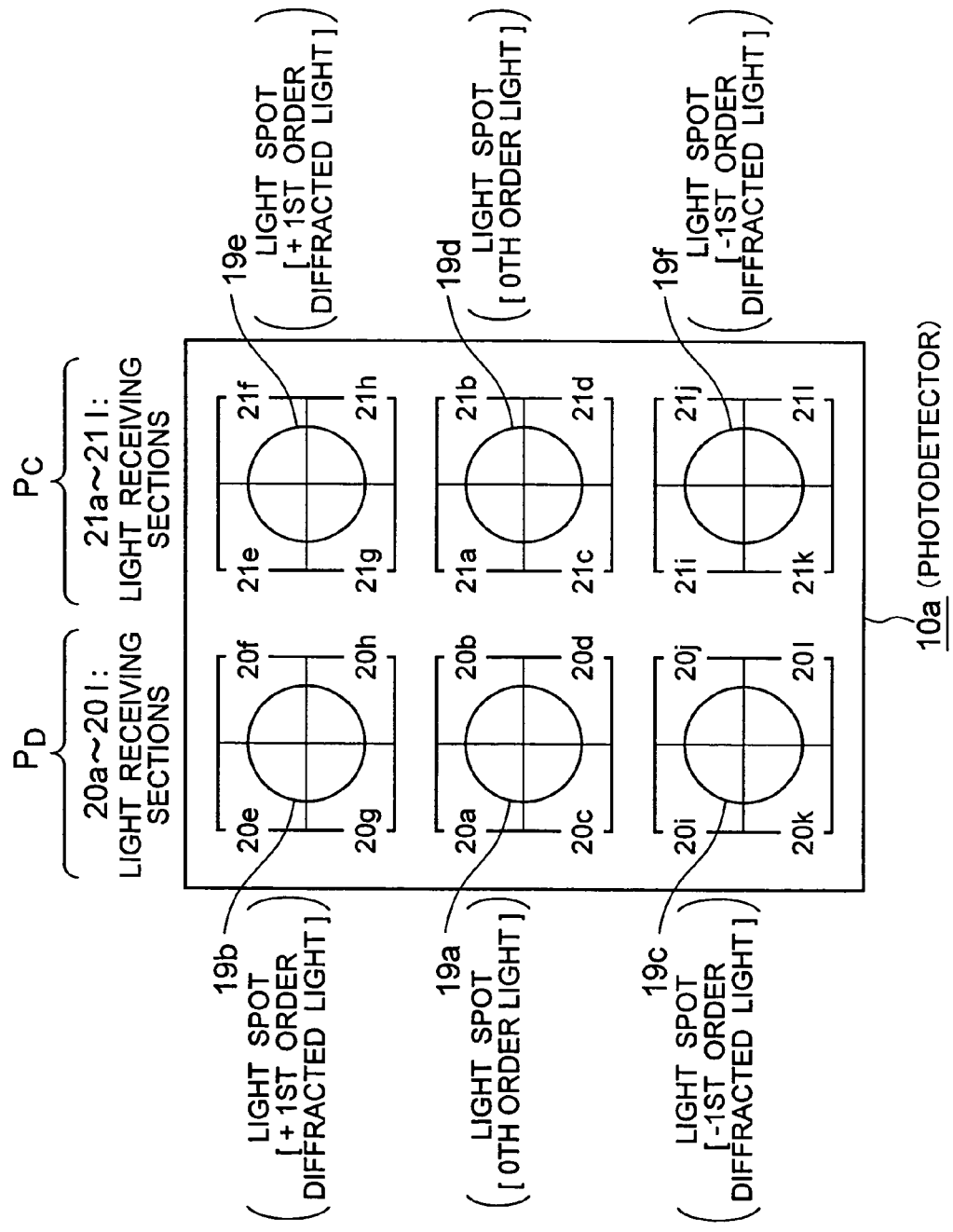
FIG. 5 is an illustration for showing a pattern of light receiving sections of a photodetector and positioning of the light spots on the photodetector in the first embodiment of the optical head device of the present invention.

FIG. 5 shows the patterns of light receiving sections of the photodetector 10a and the positions of the light spots on the photodetector 10a.

A light spot 19a corresponds to the 0th-order light of the light $P_D$ from the diffractive optical element 3a, which is received in four light receiving sections 20a-20d divided by a parting line which is in parallel with a direction corresponding to a tangential direction of the disk 7 passing through an optical axis and a parting line which is in parallel with the direction corresponding to the radius direction. A light spot 19b corresponds to the +1st-order diffracted light of the light $P_D$ from the diffractive optical element 3a, which is received in four light receiving sections 20e-20h divided by the parting line which is in parallel with the direction corresponding to the tangential direction of the disk 7 passing through the optical axis and the parting line which is in parallel with the direction corresponding to the radius direction. A light spot 19c corresponds to the −1st-order diffracted light of the light $P_D$ from the diffractive optical element 3a, which is received in four light receiving sections 20i-20l divided by the parting line which is in parallel with the direction corresponding to the tangential direction of the disk 7 passing through the optical axis and the parting line which is in parallel with the direction corresponding to the radius direction. The row of the three focused spots on the disk 7 is roughly in the tangential direction. However, the row of the light spots 19a, 19b, 19c on the photodetector 10a is roughly in the radial direction due to the effect of the cylindrical lens 8 and the lens 9.

A light spot 19d corresponds to the 0th-order light of the light $P_C$ from the diffractive optical element 3a, which is received in four light receiving sections 21a-21d divided by a parting line which is in parallel with a direction corresponding to a tangential direction of the disk 7 passing through an optical axis and a parting line which is in parallel with the direction corresponding to the radius direction. A light spot 19e corresponds to the +1st-order diffracted light of the light $P_C$ from the diffractive optical element 3a, which is received in four light receiving sections 21e-21h divided by the parting line which is in parallel with the direction corresponding to the tangential direction of the disk 7 passing through the optical axis and the parting line which is in parallel with the direction corresponding to the radius direction. A light spot 19f corresponds to the −1st-order diffracted light of the light $P_C$ from the diffractive optical element 3a, which is received in four light receiving sections 21i-21l divided by the parting line which is in parallel with the direction corresponding to the tangential direction of the disk 7 passing through the optical axis and the parting line which is in parallel with the direction corresponding to the radius direction. The row of the three focused spots on the disk 7 is roughly in the tangential direction. However, the row of the light spots 19d, 19e, 19f on the photodetector 10a is roughly in the radial direction due to the effect of the cylindrical lens 8 and the lens 9.

Provided that the outputs from the light receiving sections 20a-20l and 21a-21l are expressed as V20a-V20l and V21a-V21l, respectively, the focus error signal for DVD can be obtained by an astigmatism method through an arithmetic operation of $$(V20a+V20d)-(V20b+V20c)$$

The track error signal for DVD can be obtained by the differential push-pull method through an arithmetic operation of (V20a+V20b)−(V20c+V20d)−α·{(V20e+V20f+
V20i+V20j)−(V20g+V20h+V20k+
V20l)}(α is a constant)

The RF signal for DVD can be obtained through an arithmetic operation of

V20a+V20b+V20c+V20d

The focus error signal for CD can be obtained by the astigmatism method through an arithmetic operation of (V21a+V21d)−(V21b+V21c)

The track error signal for CD can be obtained by the differential push-pull method through an arithmetic operation of (V21a+V21b)−(V21c+V21d)−β·{(V21e+V21f+
V21i+V21j)−(V21g+V21h+V21k+
V21l)}(β is a constant)

The RF signal for CD can be obtained through an arithmetic operation of

V21a+V21b+V21c+V21d

The functions of the wave plates 14a, 14b, 14c in the diffractive optical element 3a used in the embodiment may not necessarily be the ones described in FIG. 4, as long as the polarization directions of the light $P_D$ and the light $P_C$ making incidence to the diffractive optical element 3a are consistent, the polarization directions of the light $P_D$ and the light $P_C$ making incidence to the diffraction grating 15a are orthogonal to each other, the polarization directions of the light $P_D$ and the light $P_C$ making incidence to the diffraction grating 15b are orthogonal to each other, and the polarization directions of the light $P_D$ and the light $P_C$ emitted from the diffractive optical element 3a are consistent.

The wave plates 14a, 14b and 14c are selected appropriately from the following three types (1)-(3). (1) A wave plate which functions as a half-wave plate for the light $P_D$ for converting the polarization direction of the incident light by 90° and functions as a full wave plate for the light $P_C$. (2) A wave plate which functions as a full wave plate for the light $P_D$ and functions as a half-wave plate for the light $P_C$ for converting the polarization direction of the incident light by 90°. (3) A wave plate which functions as a wideband half-wave plate for the light $P_D$ and the light $P_C$ for converting the polarization direction of the incident light by 90°. It is possible to omit the wave plate 14b.

Furthermore, the functions of the diffraction gratings 15a, 15b in the diffractive optical element 3a used in the embodiment may not necessarily be the ones described in FIG. 4, as long as: the diffraction grating 15a divides either one of the light $P_D$ or the light $P_C$ into three light beams of 0th-order light as the main beam and the ±1st-order diffracted light as the sub-beams and transmits the other light almost entirely; and the diffraction grating 15b divides the other light which has transmitted through the diffraction grating 15a into three light beams of the 0th-order light as the main beam and the ±1st-order diffracted light as the sub-beams and almost entirely transmits the light beams which have been divided into three light beams in the diffraction grating 15a.

The diffraction gratings 15a and 15b are selected appropriately from the following two types (1)-(2). (1) A diffraction grating in which the refractive index of the liquid crystal high polymer or the like is the same as the refractive index of the filler for the polarized light which is in parallel to the optical axis and is different from the refractive index of the filler for the polarized light which is vertical to the optical axis. (2) A diffraction grating in which the refractive index of the liquid crystal high polymer or the like is different from the refractive index of the filler for the polarized light which is in parallel to the optical axis and is the same as the refractive index of the filler for the polarized light which is vertical to the optical axis. The polarized light parallel to the optical axis and the polarized light vertical to the optical axis may not be consistent with the TE-polarized light and the TM-polarized light, respectively.

In a second embodiment of the optical head device according to the present invention, the semiconductor laser 1a of the first embodiment is replaced with a semiconductor laser 1b, the diffractive optical element 3a with a diffractive optical element 3b, and the photodetector 10a with a photodetector 10b. The semiconductor laser 1b comprises a semiconductor laser for emitting light $P_H$ for HD DVD, a semiconductor laser for emitting light $P_D$ for DVD, and a semiconductor laser for emitting light $P_C$ for CD housed in a common package.

The light $P_H$ emitted from a semiconductor laser 1b is collimated by a collimator lens 2. The collimated light is then divided into three light beams by a diffractive optical element 3b which are the 0th-order light as a main beam and the ±1st-order diffracted lights as sub-beams. The light beams enter a polarizing beam splitter 4 as the P polarized light and substantially 100% transmit therethrough. Then, they transmit through a quarter-wave plate 5 to be converted from the linearly polarized light to the circularly polarized light thereby to be focused onto a disk 7 as an optical recording medium of the HD DVD standard by an objective lens 6. The three light beams reflected from the disk 7 transmit inversely through the objective lens 6 and then transmit the quarter-wave plate 5 to be converted from the circularly polarized light to linearly polarized light whose polarization direction is orthogonal to that in the outward path. The light beams then enter the polarizing beam splitter 4 as S polarized light and substantially 100% is reflected thereby to be received by a photodetector 10b through a cylindrical lens 8 and lens 9.

The light $P_D$ emitted from a semiconductor laser 1b is collimated by a collimator lens 2. The collimated light is then divided into three light beams by a diffractive optical element 3b which are the 0th-order light as a main beam and the ±1st-order diffracted lights as sub-beams. The light beams enter a polarizing beam splitter 4 as the P polarized light and substantially 100% transmit therethrough. Then, they transmit through a quarter-wave plate 5 to be converted from the linearly polarized light to the circularly polarized light thereby to be focused onto a disk 7 as an optical recording medium of the DVD standard by an objective lens 6. The three light beams reflected from the disk 7 transmit inversely through the objective lens 6 and then transmit the quarter-wave plate 5 to be converted from the circularly polarized light to linearly polarized light whose polarization direction is orthogonal to that in the outward path. The light beams then enter the polarizing beam splitter 4 as S polarized light and substantially 100% is reflected thereby to be received by a photodetector 10b through a cylindrical lens 8 and lens 9.

The light $P_C$ emitted from a semiconductor laser 1b is collimated by a collimator lens 2. The collimated light is then divided into three light beams by a diffractive optical element 3b which are the 0th-order light as a main beam and the ±1st-order diffracted lights as sub-beams. The light beams enter a polarizing beam splitter 4 as the P polarized light and substantially 100% transmit therethrough. Then, they transmit through a quarter-wave plate 5 to be converted from the linearly polarized light to the circularly polarized light thereby to be focused onto a disk 7 as an optical recording medium of the CD standard by an objective lens 6. The three light beams reflected from the disk 7 transmit inversely through the objective lens 6 and then transmit the quarter-wave plate 5 to be converted from the circularly polarized light to linearly polarized light whose polarization direction is orthogonal to that in the outward path. The light beams then enter the polarizing beam splitter 4 as S polarized light and substantially 100% is reflected thereby to be received by a photodetector 10b through a cylindrical lens 8 and lens 9.

FIG. 6 is a cross section of the diffractive optical element 3b. The diffractive optical element 3b has a structure in which a wave plate 14d, a diffraction grating 15c, a wave plate 14e, a diffraction grating 15d, a wave plate 14f, a diffraction grating 15e, and a wave plate 14g are laminated. For the wave plates 14d, 14e, 14f and 14g, crystals having a birefringent characteristic can be used or it is also possible to use ones in which liquid crystal high polymer or the like having the birefringent characteristic is sandwiched by glass substrates. For the diffraction gratings 15c, 15d and 15e, it is possible to use the one obtained by forming a pattern of the liquid crystal high polymer or the like having the birefringent characteristic on one of the wave plates 14d, 14e, 14f, 14g and then filled with filler. It is also possible to use the one obtained by forming a pattern of the liquid crystal high polymer or the like having the birefringent characteristic on a glass substrate and then filled with filler. The plane shape of the pattern of the liquid crystal high polymer or the like is in a straight line form at equal intervals and the cross section is in a rectangular shape. The wave plate 14d, the diffraction grating 15c, the wave plate 14e, the diffraction grating 15d, and the wave plate 14f, the diffraction grating 15e, and the wave plate 14g are integrated with an adhesive provided in between as necessary.

The wave plates 14d and 14f function as full wave plates for the light $P_H$ and the light $P_C$ and functions as a half-wave plate for the light $P_D$ for converting the polarization direction of the incident light by 90°. This can be achieved by setting the phase difference by the wave plates 14d and 14f to be a multiple of integers of $2\pi$ for the light $P_H$, to be a multiple of odd numbers of $\pi$ for the light $P_D$, and to be a multiple of integers of $2\pi$ for the light $P_C$. For example, if the phase difference by the wave plates 14d and 14f is $2\pi/\lambda \times 1600$ nm ($\lambda$ is the wavelength of the incident light), the phase difference when $\lambda=400$ nm becomes $2\pi \times 4$, and it becomes $\pi \times 4.92$ when $\lambda=650$ nm. Thus, the phase difference when $\lambda=780$ nm becomes $2\pi \times 2.05$, which substantially satisfies the above-described conditions.

The wave plates 14e and 14g function as full wave plates for the light $P_H$ and the light $P_D$ and functions as a half-wave plate for the light $P_C$ for converting the polarization direction of the incident light by 90°. This can be achieved by setting the phase difference by the wave plates 14e and 14g to be a multiple of integers of $2\pi$ for the light $P_H$, to be a multiple of integers of $2\pi$ for the light $P_D$, and to be a multiple of odd numbers of $\pi$ for the light $P_C$. For example, if the phase difference by the wave plates 14e and 14g is $2\pi/\lambda \times 2000$ nm ($\lambda$ is the wavelength of the incident light), the phase difference when $\lambda=400$ nm becomes $2\pi \times 5$, and it becomes $2\pi \times 3.08$ when $\lambda=650$ nm. Thus, the phase difference when $\lambda=780$ nm becomes $\pi \times 5.13$, which substantially satisfies the above-described conditions. That is, the wave plates 14d-14g function as the full wave plate→full wave plate→full wave plate→full wave plate for the light $P_H$, functions as half-wave plate→full wave plate→half-wave plate→full wave plate for the light $P_D$ and function as the full wave plate→half-wave plate→full wave plate→half-wave plate for the light $P_C$.

The direction of the grooves of the diffraction gratings 15c, 15d, and 15e is the direction vertical to the face of the page of the drawing. The linearly polarized light whose polarization direction is parallel to the grooves of the diffraction gratings 15c, 15d, 15e, i.e. the linearly polarized light vertical to the face of the page of the drawing, is TE-polarized light, and the linearly polarized light whose polarization direction is vertical to the grooves of the diffraction gratings 15c, 15d, 15e, i.e. the linearly polarized light parallel to the face of the page of the drawing is TM-polarized light. At this time, the refractive index of the liquid crystal high polymer or the like in the diffraction gratings 15c, 15e is different from the refractive index of the filler for the TE-polarized light and is the same as the refractive index of the filler for the TM-polarized light. Further, the refractive index of the liquid crystal high polymer or the like in the diffraction grating 15d is the same as the refractive index of the filler for the TE-polarized light and is different from the refractive index of the filler for the TM-polarized light. That is, the diffraction gratings 15c and 15e function as the diffraction gratings only for the TE-polarized light, and the diffraction grating 15d functions as the diffraction grating only for the TM-polarized light.

FIG. 6(a) shows the light $P_H$ for HD DVD. The light $P_H$ makes incidence to the diffractive optical element 3b as the TM-polarized light. This light as the TM-polarized light transmits through the wave plate 14d as it is, and then makes incidence to the diffraction grating 15c thereby transmitting almost entirely through the diffraction grating 15c. This light as the TM-polarized light transmits through the wave plate 14e as it is and makes incidence to the diffraction grating 15d. Thus, it is divided into three light beams of the 0th-order light as the main beam and ±1st-order diffracted light as the sub-beams in the diffraction grating 15d. The ratio of light quantities of the main beam and the sub-beams is determined by the groove depth of the diffraction grating 15d and the space between the main beam and the sub-beams on the optical recording medium is determined by the groove cycle of the diffraction grating 15d. These light beams as the TM-polarized light transmit through the wave plate 14f in that state and make incidence to the diffraction grating 15e thereby transmitting through the diffraction grating 15e almost entirely. These light beams as the TM-polarized light transmit through the wave plate 14g in that state and are emitted from the diffractive optical element 3b as the TM-polarized light.

FIG. 6(b) shows the light $P_D$ for DVD. The light $P_D$ makes incidence to the diffractive optical element 3b as the TM-polarized light. This light transmits through the wave plate 14d and converted from the TM-polarized light into the TE-polarized light to make incidence to the diffraction grating 15c. Thus, it is divided into three light beams of the 0th-order light as the main beam and ±1st-order diffracted light as the sub-beams in the diffraction grating 15c. The ratio of light quantities of the main beam and the sub-beam is determined by the groove depth of the diffraction grating 15c and the space between the main beam and the sub-beams on the optical recording medium is determined by the groove cycle of the diffraction grating 15c. These light beams as the TE-polarized light transmit through the wave plate 14e in that state and make incidence to the diffraction grating 15d. These light beams transmit through the wave plate 14f and converted from the TE-polarized light into the TM-polarized light to make incidence to the diffraction grating 15e. Therefore, almost the entire light beams transmit through the diffraction grating 15e. These light beams as the TM-polarized light transmit through the wave plate 14g in that state and are emitted from the diffractive optical element 3b as the TM-polarized light.

FIG. 6(c) shows the light $P_C$ for CD. The light $P_C$ makes incidence to the diffractive optical element 3b as the TM-polarized light. This light as the TM-polarized light transmits through the wave plate 14d as it is and makes incidence to the diffraction grating 15c thereby transmitting almost entirely through the diffraction grating 15c. This light transmits through the wave plate 14e and converted from the TM-polarized light into the TE-polarized light to make incidence to the diffraction grating 15d. Thus, this light transmits almost entirely through the diffraction grating 15d. This light as the TE-polarized light transmits through the wave plate 14f as it is and makes incidence to the diffraction grating 15e. Therefore, it is divided into three light beams of the 0th-order light as the main beam and ±1st-order diffracted light as the sub-beams in the diffraction grating 15e. The ratio of light quantities of the main beam and the sub-beams is determined by the groove depth of the diffraction grating 15e and the space between the main beam and the sub-beams on the optical recording medium is determined by the groove cycle of the diffraction grating 15e. These light beams transmit through the wave plate 14g and converted from the TE-polarized light into the TM-polarized light to be emitted from the diffractive optical element 3b as the TM-polarized light.

As described above, in the embodiment, the optical system can be reduced in size by using the triple wavelengths light source for HD DVD, DVD and CD for the optical system and the ratio of the light quantities of the main beam and the sub-beams and the space therebetween on the optical recording medium can be individually determined for the light $P_H$, the light $P_D$ and the light $P_C$. Therefore, it is possible to attain a stable track error signal by the differential push-pull method. Furthermore, loss of the light quantities in the inward light and the outward light can be suppressed by matching the direction of the TM-polarized light in the diffractive optical element 3b and the direction of the P-polarized light in the polarizing beam splitter 4. Thus, the efficiency becomes high.

Figure 12:
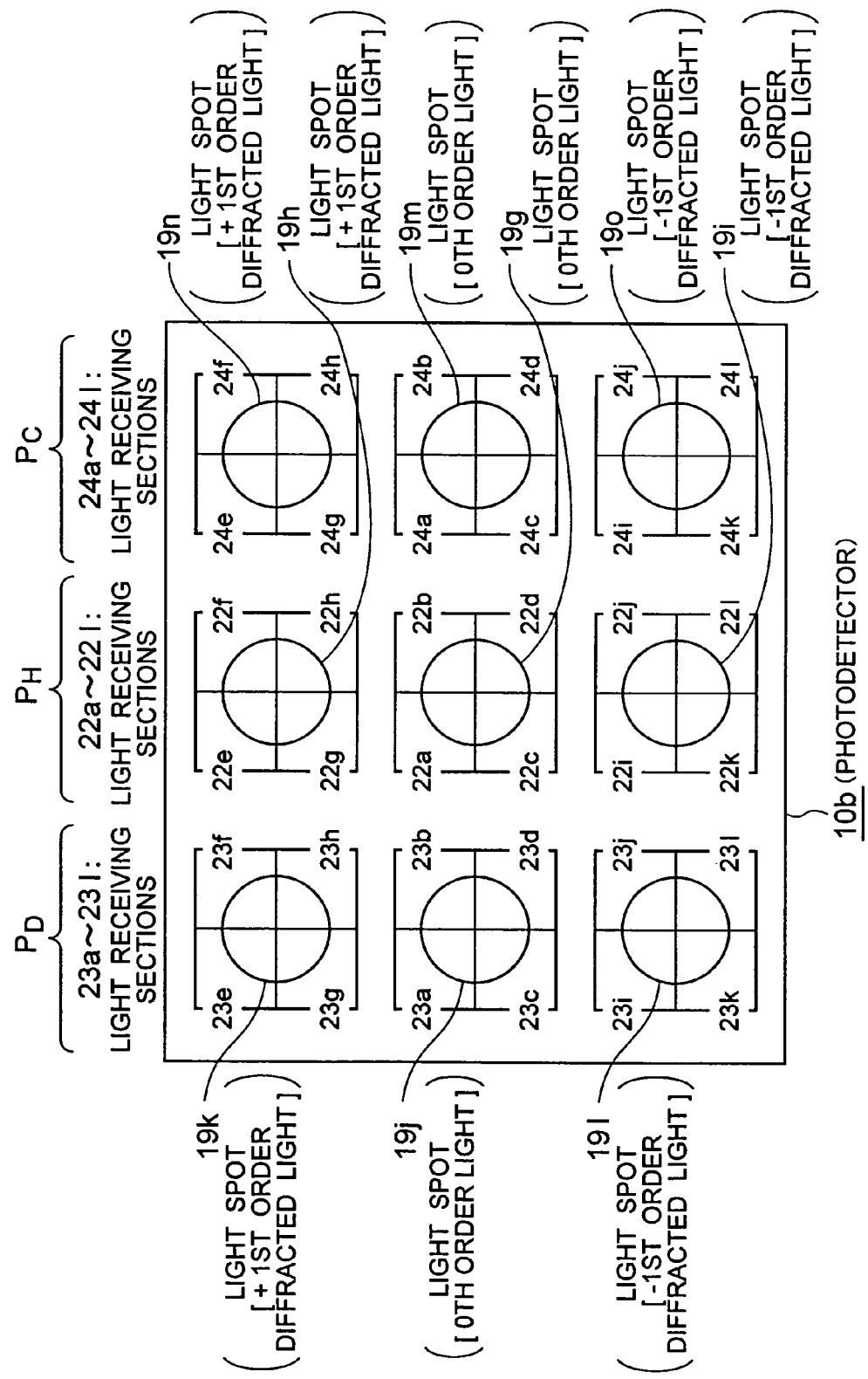
FIG. 12 is an illustration for showing a pattern of light receiving sections of a photodetector and positioning of the light spots on the photodetector in the second embodiment of the optical head device of the present invention.

FIG. 12 shows the patterns of light receiving sections of the photodetector 10b and the positions of the light spots on the photodetector 10b.

A light spot 19g corresponds to the 0th-order light of the light $P_H$ from the diffractive optical element 3b, which is received in four light receiving sections 22a-22d divided by a parting line which is in parallel with a direction corresponding to a tangential direction of the disk 7 passing through an optical axis and a parting line which is in parallel with the direction corresponding to the radius direction. A light spot 19h corresponds to the +1st-order diffracted light of the light $P_H$ from the diffractive optical element 3b, which is received in four light receiving sections 22e-22h divided by the parting line which is in parallel with the direction corresponding to the tangential direction of the disk 7 passing through the optical axis and the parting line which is in parallel with the direction corresponding to the radius direction. A light spot 19i corresponds to the −1st-order diffracted light of the light $P_H$ from the diffractive optical element 3b, which is received in four light receiving sections 22i-22l divided by the parting line which is in parallel with the direction corresponding to the tangential direction of the disk 7 passing through the optical axis and the parting line which is in parallel with the direction corresponding to the radius direction. The row of the three focused spots on the disk 7 is roughly in the tangential direction. However, the row of the light spots 19g, 19h, 19i on the photodetector 10b is roughly in the radial direction due to the effect of the cylindrical lens 8 and the lens 9.

A light spot 19j corresponds to the 0th-order light of the light $P_D$ from the diffractive optical element 3b, which is received in four light receiving sections 23a-23d divided by a parting line which is in parallel with a direction corresponding to a tangential direction of the disk 7 passing through an optical axis and a parting line which is in parallel with the direction corresponding to the radius direction. A light spot 19k corresponds to the +1st-order diffracted light of the light $P_D$ from the diffractive optical element 3b, which is received in four light receiving sections 23e-23h divided by the parting line which is in parallel with the direction corresponding to the tangential direction of the disk 7 passing through the optical axis and the parting line which is in parallel with the direction corresponding to the radius direction. A light spot 19l corresponds to the −1st-order diffracted light of the light $P_D$ from the diffractive optical element 3b, which is received in four light receiving sections 23i-23l divided by the parting line which is in parallel with the direction corresponding to the tangential direction of the disk 7 passing through the optical axis and the parting line which is in parallel with the direction corresponding to the radius direction. The row of the three focused spots on the disk 7 is roughly in the tangential direction. However, the row of the light spots 19j, 19k, 19l on the photodetector 10b is roughly in the radial direction due to the effect of the cylindrical lens 8 and the lens 9.

A light spot 19m corresponds to the 0th-order light of the light $P_C$ from the diffractive optical element 3b, which is received in four light receiving sections 24a-24d divided by a parting line which is in parallel with a direction corresponding to a tangential direction of the disk 7 passing through an optical axis and a parting line which is in parallel with the direction corresponding to the radius direction. A light spot 19n corresponds to the +1st-order diffracted light of the light $P_C$ from the diffractive optical element 3b, which is received in four light receiving sections 24e-24h divided by the parting line which is in parallel with the direction corresponding to the tangential direction of the disk 7 passing through the optical axis and the parting line which is in parallel with the direction corresponding to the radius direction. A light spot 19o corresponds to the −1st-order diffracted light of the light $P_C$ from the diffractive optical element 3b, which is received in four light receiving sections 24i-24l divided by the parting line which is in parallel with the direction corresponding to the tangential direction of the disk 7 passing through the optical axis and the parting line which is in parallel with the direction corresponding to the radius direction. The row of the three focused spots on the disk 7 is roughly in the tangential direction. However, the row of the light spots 19m, 19n, 19o on the photodetector 10b is roughly in the radial direction due to the effect of the cylindrical lens 8 and the lens 9.

Provided that the outputs from the light receiving sections 22a-22l, 23a-23l, and 24a-24l are expressed as V22a-V22l, V23a-V23l, and V24a-V24l, respectively, the focus error signal for HD DVD can be obtained by an astigmatism method through an arithmetic operation of $$(V22a+V22d)-(V22b+V22c)$$

The track error signal for HD DVD can be obtained by the differential push-pull method through an arithmetic operation of $$(V22a+V22b)-(V22c+V22d)-\gamma \cdot \{(V22e+V22f+V22i+V22j)-(V22g+V22h+V22k+V22l)\} \text{ ($\gamma$ is a constant)}$$

The RF signal for HD DVD can be obtained through an arithmetic operation of $$V22a+V22b+V22c+V22d$$

The focus error signal for DVD can be obtained by an astigmatism method through an arithmetic operation of (V23a+V23d)−(V23b+V23c)

The track error signal for DVD can be obtained by the differential push-pull method through an arithmetic operation of (V23a+V23b)−(V23c+V23d)−δ·{(V23e+V23f+
V23i+V23j)−(V23g+V23h+V23k+
V23l)} (δ is a constant)

The RF signal for DVD can be obtained through an arithmetic operation of

V23a+V23b+V23c+V23d

The focus error signal for CD can be obtained by the astigmatism method through an arithmetic operation of (V24a+V24d)−(V24b+V24c)

The track error signal for CD can be obtained by the differential push-pull method through an arithmetic operation of (V24a+V24b)−(V24c+V24d)−ε·{(V24e+V24f+
V24i+V24j)−(V24g+V24h+V24k+
V24l)} (ε is a constant)

The RF signal for CD can be obtained through an arithmetic operation of

V24a+V24b+V24c+V24d

The functions of the wave plates $14d$, $14e$, $14f$, $14g$ in the diffractive optical element $3b$ used in the embodiment may not necessarily be the ones described in FIG. 6, as long as: the polarization directions of the light $P_H$, the light $P_D$ and the light $P_C$ making incidence to the diffractive optical element $3b$ are consistent; the polarization direction of one of the light $P_H$, the light $P_D$ and the light $P_C$ making incidence to the diffraction grating $15c$ is orthogonal to the polarization direction of other two light beams; among the light $P_H$, the light $P_D$ and the light $P_C$ making incidence to the diffraction grating $15d$, the polarization direction of either one of the two light beams (except for the light whose polarization direction is different from other two light beams in the diffraction grating $15c$) is orthogonal to the polarization direction of the rest of the two light beams; among the light $P_H$, the light $P_D$ and the light $P_C$ making incidence to the diffraction grating $15e$, the polarization direction of the light (which is not the two light beams whose polarization directions are different from other two, respectively, in the diffraction gratings $15c$ and $15d$) is orthogonal to the polarization direction of the other two light beams; and the polarization directions of the light $P_H$, the light $P_D$ and the light $P_C$ emitted from the diffractive optical element $3b$ are consistent.

The wave plates $14d$, $14e$, $14f$ and $14g$ are selected appropriately from the following six types (1)-(6). (1) A wave plate which functions as a half-wave plate for the light $P_H$ for converting the polarization direction of the incident light by 90° and functions as a full wave plate for the light $P_D$ and the light $P_C$. (2) A wave plate which functions as a full wave plate for the light $P_H$ and the light $P_C$ and functions as a half-wave plate for the light $P_D$ for converting the polarization direction of the incident light by 90°. (3) A wave plate which functions as a full wave plate for the light $P_H$ and the light $P_D$ and functions as a half-wave plate for the light $P_C$ for converting the polarization direction of the incident light by 90°. (4) A wave plate which functions as a full wave plate for the light $P_H$ and functions as a half-wave plate for the light $P_D$ and the light $P_C$ for converting the polarization direction of the incident light by 90°. (5) A wave plate which functions as a half-wave plate for the light $P_H$ and the light $P_C$ for converting the polarization direction of the incident light by 90° and functions as a full wave plate for the light $P_D$. (6) A wave plate which functions as a half-wave plate for the light $P_H$ and the light $P_D$ for converting the polarization direction of the incident light by 90° and functions as a full wave plate for the light $P_C$.

Furthermore, the functions of the diffraction gratings $15c$, $15d$, $15e$ in the diffractive optical element $3b$ used in the embodiment may not necessarily be the ones described in FIG. 6, as long as: the diffraction grating $15c$ divides one of the light $P_H$, the light $P_D$ or the light $P_C$ into three light beams of 0th-order light as the main beam and the ±1st-order diffracted light as the sub-beams and transmits other two light beams almost entirely; the diffraction grating $15d$, among the light $P_H$, the light $P_D$, the light $P_C$, divides either one of the light beams (except for the light which is divided into three light beams in the diffraction grating $15c$) into three light beams of 0th-order light as the main beam and the ±1st-order diffracted light as the sub-beams and transmits the other two light beams almost entirely; and the diffraction grating $15e$, among the light $P_H$, the light $P_D$, the light $P_C$, divides the light (which is not the ones being divided into three light beams, respectively, in the diffraction gratings $15c$, $15d$) into three light beams of the 0th-order light as the main beam and the ±1st-order diffracted light as the sub-beams and almost entirely transmits the other two light beams.

The diffraction gratings $15c$, $15d$ and $15e$ are selected appropriately from the following two types (1)-(2). (1) A diffraction grating in which the refractive index of the liquid crystal high polymer or the like is the same as the refractive index of the filler for the polarized light which is in parallel to the optical axis and is different from the refractive index of the filler for the polarized light which is vertical to the optical axis. (2) A diffraction grating in which the refractive index of the liquid crystal high polymer or the like is different from the refractive index of the filler for the polarized light which is in parallel to the optical axis and is the same as the refractive index of the filler for the polarized light which is vertical to the optical axis. The polarized light parallel to the optical axis and the polarized light vertical to the optical axis may not be consistent with the TE-polarized light and the TM-polarized light, respectively.

In a third embodiment of the optical head device according to the present invention, the diffractive optical element $3a$ of the first embodiment is replaced with a diffractive optical element $3c$, and the photodetector $10a$ with a photodetector $10c$.

FIG. 13 is a cross section of the diffractive optical element $3c$. The diffractive optical element $3c$ has a structure in which a diffraction grating $16a$ is inserted between the wave plate $14b$ and the diffraction grating $15b$ of the diffractive optical element $3a$ shown in FIG. 4. For the diffraction grating $16a$, it is possible to use the one obtained by forming a pattern of the liquid crystal high polymer or the like having the birefringent characteristic on the wave plate $14b$ and then filled with filler. It is also possible to use the one obtained by forming a pattern of the liquid crystal high polymer or the like having the birefringent characteristic on a glass substrate and then filled with filler. The plane shape of the pattern of the liquid crystal high polymer or the like is in a straight line form at equal intervals and the cross section is in a saw-tooth shape. The diffraction grating $16a$ may be inserted between the diffraction grating $15b$ and the wave plate $14c$.

The direction of the groove of the diffraction grating $16a$ is the direction vertical to the face of the page of the drawing.

The linearly polarized light whose polarization direction is parallel to the groove of the diffraction grating 16a i.e. the linearly polarized light vertical to the face of the page of the drawing, is TE-polarized light, and the linearly polarized light whose polarization direction is vertical to the groove of the diffraction grating 16a, i.e. the linearly polarized light parallel to the face of the page of the drawing is TM-polarized light. At this time, the refractive index of the liquid crystal high polymer or the like in the diffraction grating 16a is the same as the refractive index of the filler for the TE-polarized light and is different from the refractive index of the filler for the TM-polarized light.

FIG. 13(a) shows the light $P_D$ for DVD. Like the case described in FIG. 4 (a), the light $P_D$ is divided into three light beams of the 0th-order light as the main beam and ±1st-order diffracted light as the sub-beams in the diffraction grating 15a. The ratio of light quantities of the main beam and the sub-beams is determined by the groove depth of the diffraction grating 15a and the space between the main beam and the sub-beam on the optical recording medium is determined by the groove cycle of the diffraction grating 15a. These light beams transmit through the diffraction grating 16a and the diffraction grating 15b almost entirely.

FIG. 13(b) shows the light $P_C$ for CD. Like the case described in FIG. 4 (b), the light $P_C$ almost entirely transmits through the diffraction grating 15a. This light is almost entirely diffracted in the diffraction grating 16a as −1st-order diffracted light and divided into three light beams of the 0th-order light as the main beam and ±1st-order diffracted light as the sub-beams in the diffraction grating 15b. The ratio of light quantities of the main beam and the sub-beams is determined by the groove depth of the diffraction grating 15b and the space between the main beam and the sub-beams on the optical recording medium is determined by the groove cycle of the diffraction grating 15b.

When the emission point of the semiconductor laser for DVD housed in the semiconductor laser 1a is adjusted to the optical axis of the diffractive optical element 3c, the emission point of the semiconductor laser for CD housed in the semiconductor laser 1a is shifted from the optical axis of the diffractive optical element 3c. If the emission point of the semiconductor laser for CD is shifted to the downward direction of FIG. 13 with respect to the optical axis of the diffractive optical element 3c, the emission point of the semiconductor laser for CD on the appearance can be adjusted to the optical axis of the diffractive optical element 3c by setting the direction of the saw-tooth of the diffraction grating 16a to deflect the −1st-order diffracted light towards the downward direction of FIG. 13 and appropriately setting the cycles of the saw-tooth in accordance with the space between each emission point of the semiconductor lasers for DVD and CD. The depth of the saw-tooth of the diffraction grating 16a is so determined that the diffraction efficiency of the −1st-order diffracted light becomes the maximum. As described above, by giving the optical axis correcting function to the diffractive optical element 3c, the number of light receiving sections of the photodetector 10c can be reduced as will be described below.

In the embodiment, as in the first embodiment, loss of the light quantities in the inward light and the outward light can be suppressed by matching the direction of the TM-polarized light in the diffractive optical element 3c and the direction of the P-polarized light in the polarizing beam splitter 4 so that the efficiency becomes high.

Furthermore, the functions of the diffraction grating 16a in the diffractive optical element 3c used in the embodiment may not necessarily be the ones described in FIG. 13, as long as the diffraction grating 16a diffracts either the light $P_D$ or the light $P_C$ almost entirely as the 1st-order diffracted light and entirely transmits the other light. The diffraction grating 16a is selected appropriately from the following two types (1)-(2). (1) A diffraction grating in which the refractive index of the liquid crystal high polymer or the like is the same as the refractive index of the filler for the polarized light which is in parallel to the optical axis and is different from the refractive index of the filler for the polarized light which is vertical to the optical axis. (2) A diffraction grating in which the refractive index of the liquid crystal high polymer or the like is different from the refractive index of the filler for the polarized light which is in parallel to the optical axis and is the same as the refractive index of the filler for the polarized light which is vertical to the optical axis. The polarized light parallel to the optical axis and the polarized light vertical to the optical axis may not be consistent with the TE-polarized light and he TM-polarized light, respectively.

In a fourth embodiment of the optical head device according to the present invention, the diffractive optical element 3b of the second embodiment is replaced with a diffractive optical element 3d, and the photodetector 10b with a photodetector 10c.

Figure 14:
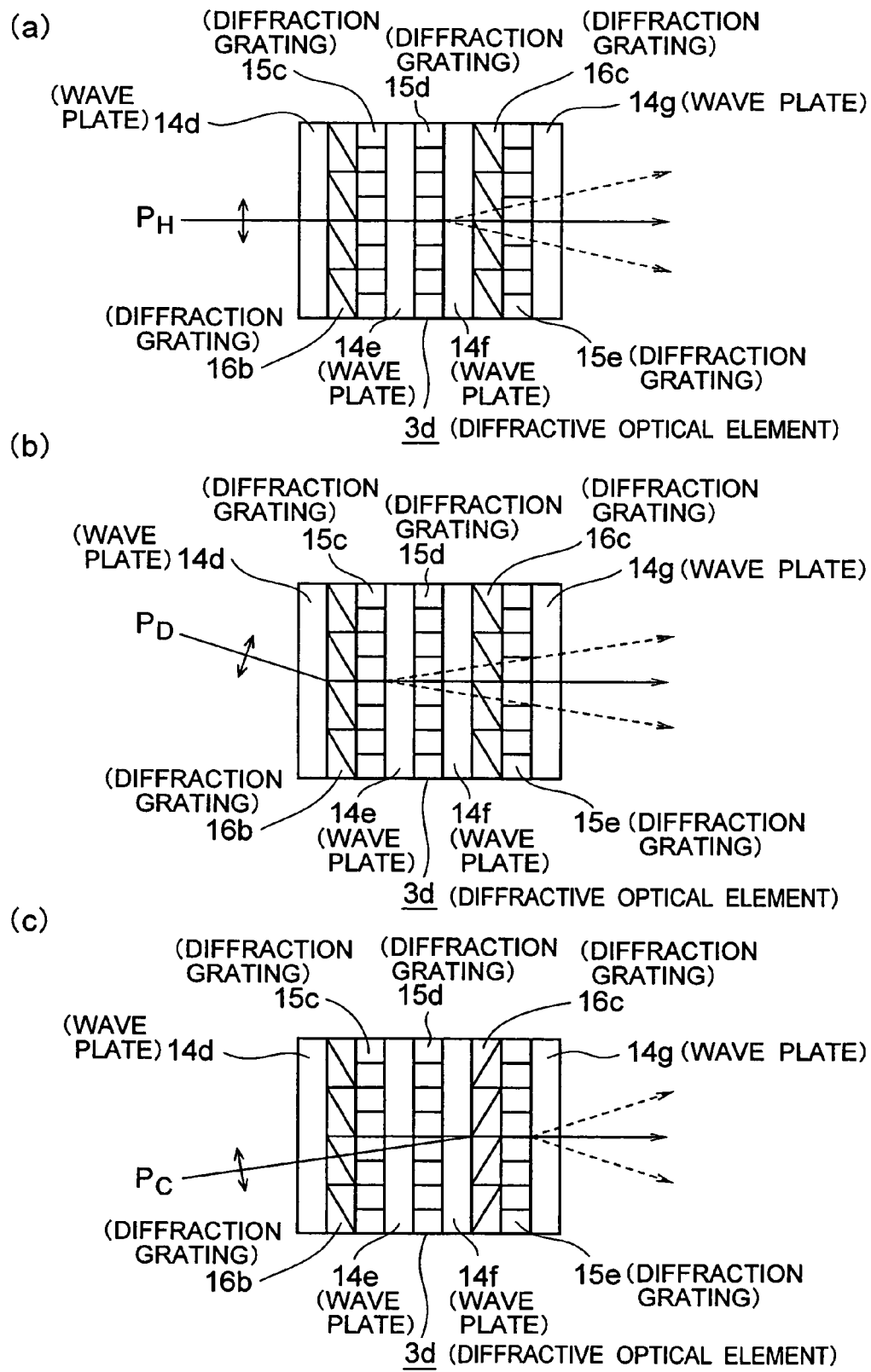
FIG. 14 illustrates cross sections of a diffractive optical element in a fourth embodiment of the optical head device of the present invention.

FIG. 14 is a cross section of the diffractive optical element 3d. The diffractive optical element 3d has a structure in which a diffraction grating 16b is inserted between the wave plate 14d and the diffraction grating 15c of the diffractive optical element 3b shown in FIG. 6, and a diffraction grating 16c is inserted between the wave plate 14f and the diffraction grating 15e. For the diffraction gratings 16b, 16c, it is possible to use the one obtained by forming a pattern of the liquid crystal high polymer or the like having the birefringent characteristic on one of the wave plates 14d, 14f and then filled with filler. It is also possible to use the one obtained by forming a pattern of the liquid crystal high polymer or the like having the birefringent characteristic on a glass substrate and then filled with filler. The plane shape of the pattern of the liquid crystal high polymer or the like is in a straight line form at equal intervals and the cross section is in a saw-tooth shape. The diffraction grating 16b may be inserted between the diffraction grating 15c and the wave plate 14e, and the diffraction grating 16c may be inserted between the diffraction grating 15e and the wave plate 14g.

The direction of the grooves of the diffraction gratings 16b, 16c is the direction vertical to the face of the page of the drawing. The linearly polarized light whose polarization direction is parallel to the grooves of the diffraction gratings 16b, 16c, i.e. the linearly polarized light vertical to the face of the page of the drawing, is TE-polarized light, and the linearly polarized light whose polarization direction is vertical to the grooves of the diffraction gratings 16b, 16c, i.e. the linearly polarized light parallel to the face of the page of the drawing, is TM-polarized light. At this time, the refractive index of the liquid crystal high polymer or the like in the diffraction grating 16b, 16c is different from the refractive index of the filler for the TE-polarized light and is the same as the refractive index of the filler for the TM-polarized light.

FIG. 14(a) shows the light $P_H$ for HD DVD. Like the case described in FIG. 6 (a), the light $P_H$ almost entirely transmits through the diffraction gratings 16b, 15c. This light is divided into three light beams of the 0th-order light as the main beam and ±1st-order diffracted light as the sub-beams in the diffraction grating 15d. The ratio of light quantities of the main beam and the sub-beams is determined by the groove depth of the diffraction grating 15d and the space between the main beam and the sub-beams on the optical recording medium is determined by the groove cycle of the diffraction grating 15d.

These light beams almost entirely transmit through the diffraction grating 16c and the diffraction grating 15e.

FIG. 14(b) shows the light $P_D$ for DVD. Like the case described in FIG. 6 (b), the light $P_D$ is almost entirely diffracted in the diffraction grating 16b as +1st-order diffracted light and divided into three light beams of the 0th-order light as the main beam and ±1st-order diffracted light as the sub-beams in the diffraction grating 15c. The ratio of light quantities of the main beam and the sub-beams is determined by the groove depth of the diffraction grating 15c and the space between the main beam and the sub-beams on the optical recording medium is determined by the groove cycle of the diffraction grating 15c. These light beams almost entirely transmit through the diffraction grating 15d. Also, these light beams almost entirely transmit through the diffraction grating 16c and the diffraction grating 15e.

FIG. 14(c) shows the light $P_C$ for CD. Like the case described in FIG. 6 (c), the light $P_C$ almost entirely transmits through the diffraction gratings 16b, 15c. This light almost entirely transmits through the diffraction grating 15d. This light is almost entirely diffracted as the −1st-order diffracted light in the diffraction grating 16c and then divided into three light beams of the 0th-order light as the main beam and ±1st-order diffracted light as the sub-beams in the diffraction grating 15e. The ratio of light quantities of the main beam and the sub-beams is determined by the groove depth of the diffraction grating 15e and the space between the main beam and the sub-beams on the optical recording medium is determined by the groove cycle of the diffraction grating 15e.

When the emission point of the semiconductor laser for HD DVD housed in the semiconductor laser 1b is adjusted to the optical axis of the diffractive optical element 3d, the emission points of the semiconductor lasers for DVD and CD housed in the semiconductor laser 1b are shifted from the optical axis of the diffractive optical element 3d. If the emission point of the semiconductor laser for DVD is shifted to the upward direction of FIG. 14 with respect to the optical axis of the diffractive optical element 3d and the emission point of the semiconductor laser for CD is shifted to the downward direction of FIG. 14 with respect to the optical axis of the diffractive optical element 3d, the emission point of the semiconductor laser for DVD on the appearance can be adjusted to the optical axis of the diffractive optical element 3d by setting the direction of the saw-tooth of the diffraction grating 16b to deflect the +1st-order diffracted light towards the upward direction of FIG. 14 and appropriately setting the cycles of the saw-tooth in accordance with the space between each emission point of the semiconductor lasers for HD DVD and DVD. Further, by setting the direction of the saw-tooth of the diffraction grating 16c to deflect the −1st-order diffracted light towards the downward direction of FIG. 14 and appropriately setting the cycles of the saw-tooth in accordance with the space between each emission point of the semiconductor lasers for HD DVD and CD, it is possible to adjust the emission point of the semiconductor laser for CD on the appearance to the optical axis of the diffractive optical element 3d. The depth of the saw-tooth of the diffraction grating 16b is so determined that the diffraction efficiency of the +1st-order diffracted light becomes the maximum, and the depth of the saw-tooth of the diffraction grating 16c is so determined that the diffraction efficiency of the −1st-order diffracted light becomes the maximum. As described above, by giving the optical axis correcting function to the diffractive optical element 3d, the number of light receiving sections of the photodetector 10c can be reduced as will be described below.

In the embodiment, as in the second embodiment, loss of the light quantities in the inward light and the outward light can be suppressed by matching the direction of the TM-polarized light in the diffractive optical element 3d and the direction of the P-polarized light in the polarizing beam splitter 4. Thus, the efficiency becomes high.

The functions of the diffraction gratings 16b, 16c in the diffractive optical element 3d used in the embodiment may not necessarily be the ones described in FIG. 14, as long as the diffraction grating 16b diffracts one of the light $P_H$, the light $P_D$ or the light $P_C$ almost entirely as the 1st-order diffracted light and entirely transmits the other two light beams, and the diffraction grating 16c, among the light $P_H$, the light $P_D$, the light $P_C$, diffracts either one of the two light beams (which are not diffracted in the diffraction grating 16b) almost entirely as the 1st-order diffracted light and entirely transmits the other two light beams. The diffraction gratings 16b, 16c are selected appropriately from the following two types (1)-(2). (1) A diffraction grating in which the refractive index of the liquid crystal high polymer or the like is the same as the refractive index of the filler for the polarized light which is in parallel to the optical axis and is different from the refractive index of the filler for the polarized light which is vertical to the optical axis. (2) A diffraction grating in which the refractive index of the liquid crystal high polymer or the like is different from the refractive index of the filler for the polarized light which is in parallel to the optical axis and is the same as the refractive index of the filler for the polarized light which is vertical to the optical axis. The polarized light parallel to the optical axis and the polarized light vertical to the optical axis may not be consistent with the TE-polarized light and he TM-polarized light, respectively.

Figure 15:
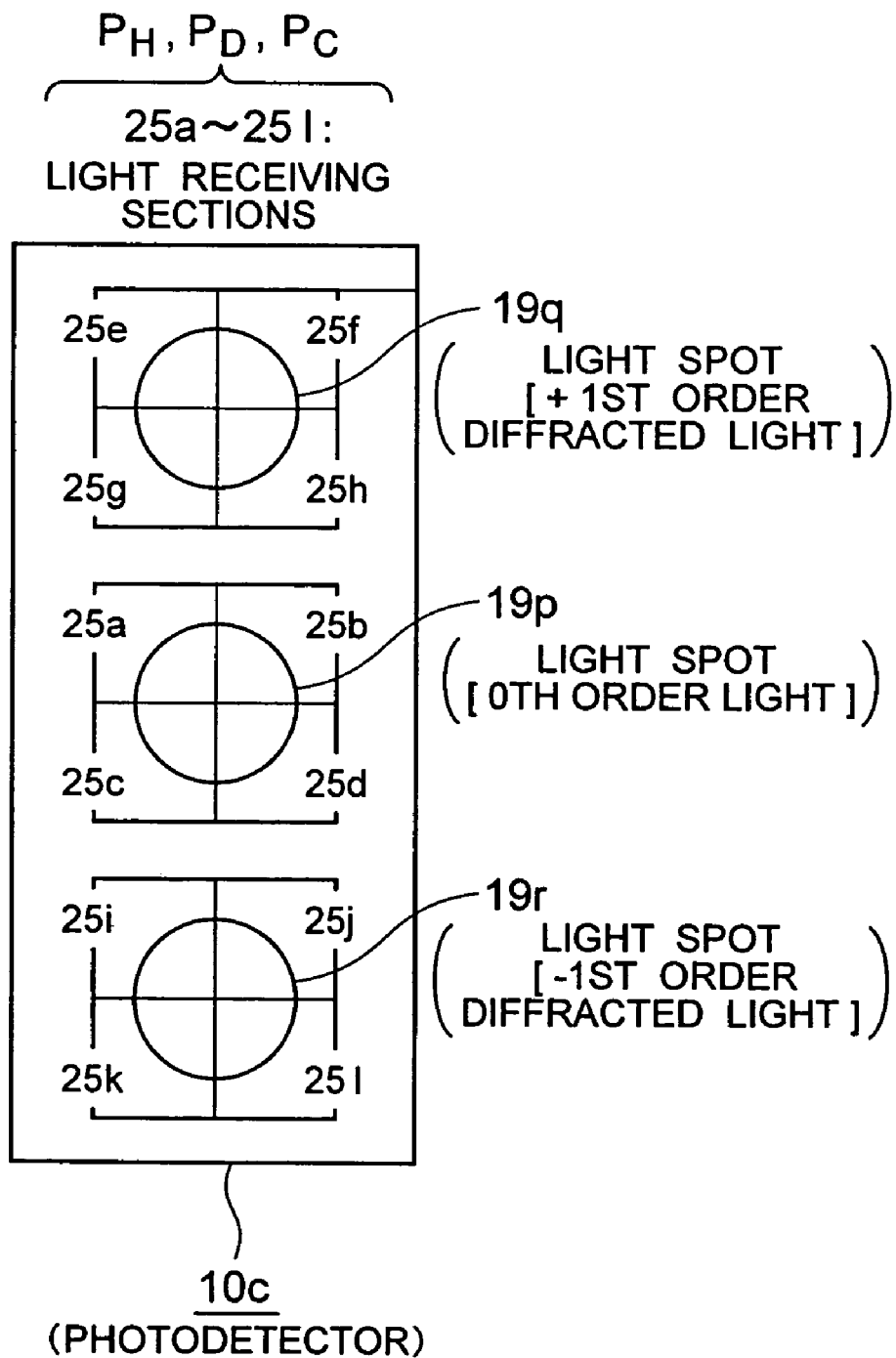
FIG. 15 is an illustration for showing a pattern of a photodetector and positioning of the light spots on the photodetector in the fourth embodiment of the optical head device of the present invention.

FIG. 15 shows the patterns of light receiving sections of the photodetector 10c and the positions of the light spots on the photodetector 10c.

In the third embodiment, a light spot 19p corresponds to the 0th-order light of the light $P_D$ and the light $P_C$ from the diffractive optical element 3c, which is received in four light receiving sections 25a-25d divided by a parting line which is in parallel with a direction corresponding to a tangential direction of the disk 7 passing through an optical axis and a parting line which is in parallel with the direction corresponding to the radius direction. A light spot 19q corresponds to the +1st-order diffracted light of the light $P_D$ and the light $P_C$ from the diffractive optical element 3c, which is received in four light receiving sections 25e-25h divided by the parting line which is in parallel with the direction corresponding to the tangential direction of the disk 7 passing through the optical axis and the parting line which is in parallel with the direction corresponding to the radius direction. A light spot 19r corresponds to the −1st-order diffracted light of the light $P_D$ and the light $P_C$ from the diffractive optical element 3c, which is received in four light receiving sections 25i-25l divided by the parting line which is in parallel with the direction corresponding to the tangential direction of the disk 7 passing through the optical axis and the parting line which is in parallel with the direction corresponding to the radius direction.

In the fourth embodiment, the light spot 19p corresponds to the 0th-order light of the light $P_H$, the light $P_D$ and the light $P_C$ from the diffractive optical element 3d, which is received in four light receiving sections 25a-25d divided by a parting line which is in parallel with a direction corresponding to a tangential direction of the disk 7 passing through an optical axis and a parting line which is in parallel with the direction corresponding to the radius direction. The light spot 19q corresponds to the +1st-order diffracted light of the light $P_H$, the light $P_D$ and the light $P_C$ from the diffractive optical element 3d, which is received in four light receiving sections 25e-25h divided by the parting line which is in parallel with the direction corresponding to the tangential direction of the disk 7 passing through the optical axis and the parting line which is in parallel with the direction corresponding to the radius direction. The light spot 19r corresponds to the −1st-order diffracted light of the light $P_H$, the light $P_D$ and the light $P_C$ from the diffractive optical element 3d, which is received in four light receiving sections 25i-25l divided by the parting line which is in parallel with the direction corresponding to the tangential direction of the disk 7 passing through the optical axis and the parting line which is in parallel with the direction corresponding to the radius direction.

The line of the three focusing spots on the disk 7 is roughly in the tangential direction. However, by the effect of the cylindrical lens 8 and the lens 9, the row of the light spots 19p, 19q, 19r on the photodetector 10c becomes roughly in the radius direction. In the third and fourth embodiments, in the same manner as described in FIG. 5 and FIG. 7, it is possible to obtain the focus error signal by the astigmatism method and to obtain the track error signal and the RF signal by the differential push-pull method.

Figure 16:
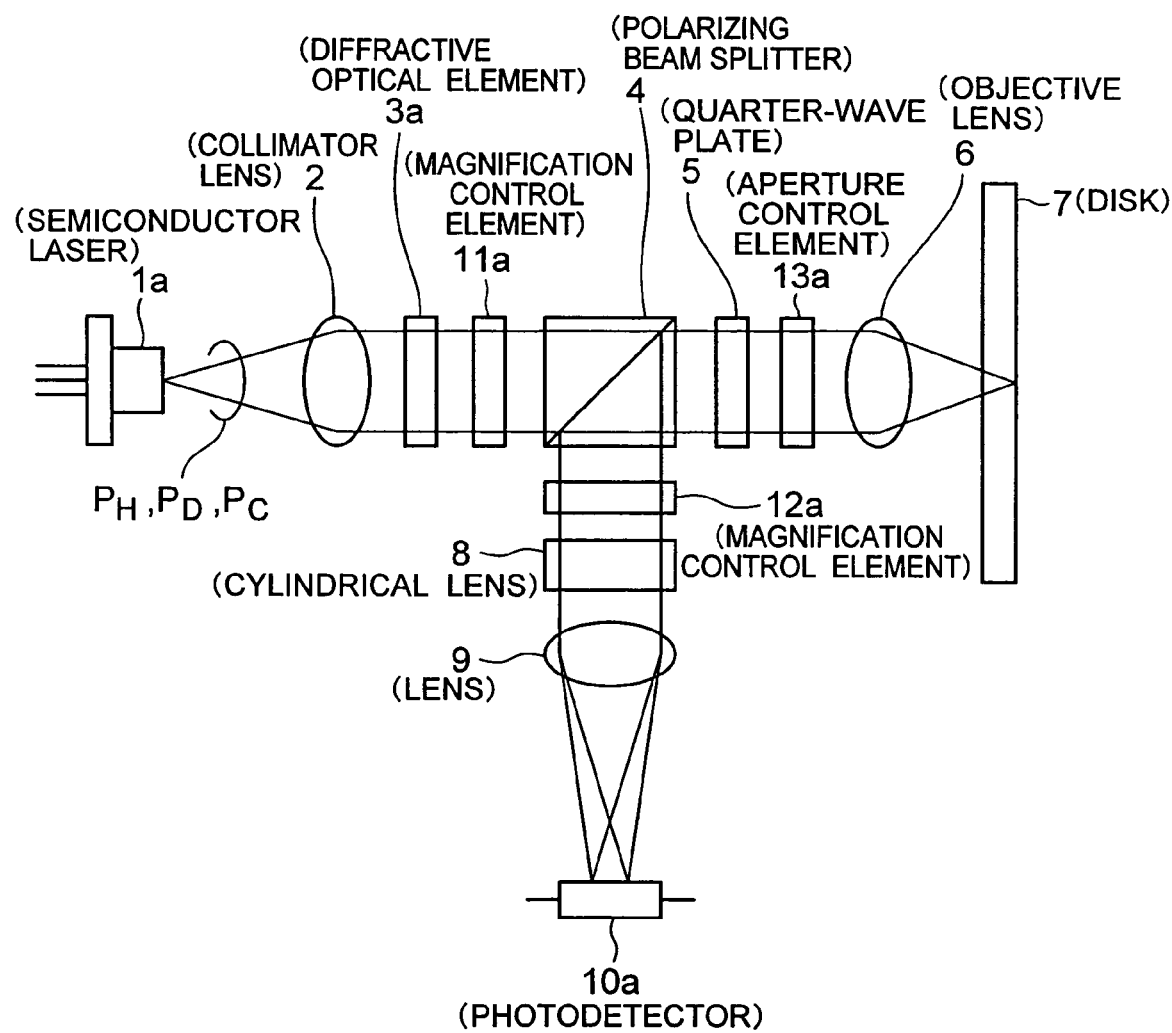
FIG. 16 is an illustration for showing a fifth embodiment of an optical head device of the present invention.

FIG. 16 shows a fifth embodiment of the optical head device according to the present invention. In the fifth embodiment, a magnification control element 11a is provided between the diffractive optical element 3a and the polarizing beam splitter 4 of the first embodiment, a magnification control element 12a between the polarizing beam splitter 4 and the cylindrical lens 8, and an aperture control element 13a between the quarter-wave plate 5 and the objective lens 6, respectively. The position of the magnification control element 11a may be anywhere between the semiconductor laser 1a and the polarizing beam splitter 4, the position of the magnification control element 12a may be anywhere between the polarizing beam splitter 4 and the photodetector 10a, and the position of the aperture control element 13a may be anywhere between the polarizing beam splitter 4 and the objective lens 6.

Generally, the objective lens used for the optical head device is so designed that the spherical aberration is corrected for a specific wavelength and a thickness of a protection layer of a specific optical recording medium. Thus, the spherical aberration is generated for other wavelengths or other thicknesses of the protection layer of the optical recording medium. Therefore, in order to perform recording and reproduction for the optical recording medium of both DVD standard and CD standard, it is necessary to correct the spherical aberration according to the type of the optical recording medium.

The objective lens 6 is so designed that the spherical aberration is corrected when the light $P_D$ making incidence to the objective lens 6 as the parallel light transmits through the protection layer of the optical recording medium of DVD standard. At the time of recording or reproducing to/from the optical recording medium of DVD standard, the magnification of the objective lens 6 is controlled by the magnification control elements 11a, 12a so that the light $P_D$ which is emitted from the semiconductor laser 1a and makes incidence to the magnification control element 11a as the parallel light is emitted from the magnification control element 11a as the parallel light and makes incidence to the objective lens 6, and the light $P_D$ which is emitted from the objective lens 6 and makes incidence to the magnification control element 12a as the parallel light is emitted from the magnification control element 12a as the parallel light and makes incidence to the light-sensing detector 10a.

When the light $P_C$ making incidence to the objective lens 6 as the parallel light transmits through the protection layer of the optical recording medium of CD standard, the spherical aberration remains. However, if the light $P_C$ is made incidence to the objective lens 6 as divergent light with an appropriate spread angle, additional spherical aberration is generated due to the change in the magnification of the objective lens 6 thereby correcting the residual spherical aberration. At the time of recording or reproducing to/from the optical recording medium of CD standard, the magnification of the objective lens 6 is controlled by the magnification control elements 11a, 12a so that the light $P_C$ which is emitted from the semiconductor laser 1a and makes incidence to the magnification control element 11a as the parallel light is emitted from the magnification control element 11a as the divergent light with an appropriate spread angle and makes incidence to the objective lens 6, and the light $P_C$ which is emitted from the objective lens 6 and makes incidence to the magnification control element 12a as the convergent light with an appropriate spread angle is emitted from the magnification control element 12a as the parallel light and makes incidence to the light-sensing detector 10a.

FIG. 17 shows cross sections of the magnification control elements 11a and 12a. The magnification control element 11a has a structure in which a wave plate 14h, a diffraction lens 17a, and a wave plate 14i are laminated. Further, the magnification control element 12a has a structure in which a wave plate 14j, a diffraction lens 17b, and a wave plate 14k are laminated. For the wave plates 14h, 14i, 14j and 14k, crystals having a birefringent characteristic can be used or it is also possible to use ones in which liquid crystal high polymer or the like having the birefringent characteristic is sandwiched by glass substrates. For the diffraction lenses 17a, 17b, it is possible to use the one obtained by forming a pattern of the liquid crystal high polymer or the like having the birefringent characteristic on one of the wave plates 14h, 14i, 14j, and 14k and then filled with filler. It is also possible to use the one obtained by forming a pattern of the liquid crystal high polymer or the like having the birefringent characteristic on a glass substrate and then filled with filler. The plane shape of the pattern of the liquid crystal high polymer or the like is in a concentric circular form at the intervals narrowing from the center towards the periphery and the cross section is in a saw-tooth shape. The wave plate 14h, the diffraction lens 17a, and the wave plate 14i are integrated with an adhesive provided in between as necessary. Also, the wave plate 14j, the diffraction lens 17b, and the wave plate 14k are integrated with an adhesive provided in between as necessary.

The wave plates 14h and 14i function as half-wave plates for the light $P_D$ for converting the polarization direction of the incident light by 9° and function as full wave plates for the light $P_C$. The wave plates 14j and 14k function as the full wave plates for the light $P_D$ and function as the half-wave plates for the light $P_C$ for converting the polarization direction of the incident light by 90°.

The linearly polarized light whose polarization direction is vertical to the face of the page of the drawing is TE-polarized light, and the linearly polarized light whose polarization direction is parallel to the face of the page of the drawing is TM-polarized light. At this time, the refractive index of the liquid crystal high polymer or the like in the diffraction lenses 17a, 17b is the same as the refractive index of the filler for the TE-polarized light and is different from the refractive index of the filler for the TM-polarized light. That is, the diffraction lenses 17a and 17b function as the diffraction lenses for only the TM-polarized light.

FIG. 17 (a) shows the light $P_D$ for DVD. The light $P_D$ makes incidence to the magnification control element 11a as the TM-polarized light. This light transmits through the wave plate 14h and converted from the TM-polarized light into the TE-polarized light to make incidence to the diffraction lens 17a. Thus, the light transmits through the diffraction lens 17a almost entirely and is kept in the parallel light. This light transmits through the wave plate 14i and converted from the TE-polarized light into the TM-polarized light to be emitted from the magnification control element 11a as the TM-polarized light.

FIG. 17(b) shows the light $P_C$ for CD. The light $P_C$ makes incidence to the magnification control element 11a as the TM-polarized light. This light as the TM-polarized light transmits through the wave plate 14h as it is and makes incidence to the diffraction lens 17a. Thus, it is almost entirely diffracted as the 1st-order diffracted light in the diffraction lens 17a and converted from the parallel light into the divergent light with an appropriate spread angle. This light as the TM-polarized light transmits through the wave plate 14i as it is and is emitted from the magnification control element 11a as the TM-polarized light. The directions and the cycles of the saw-tooth of the diffraction lens 17a are so determined that the parallel light can be converted into the divergent light with an appropriate spread angle. The depth of the saw-tooth of the diffraction lens 17a is so determined that the diffraction efficiency of the 1st-order diffracted light becomes the maximum.

FIG. 17(c) shows the light $P_D$ for DVD. The light $P_D$ makes incidence to the magnification control element 12a as the TE-polarized light. This light as the TE-polarized light transmits through the wave plate 14j as it is and makes incidence to the diffraction lens 17b. Thus, the light transmits through the diffraction lens 17b almost entirely and is kept in the parallel light. This light as the TE-polarized light transmits through the wave plate 14k as it is and emitted from the magnification control element 12a as the TE-polarized light.

FIG. 17(d) shows the light $P_C$ for CD. The light $P_C$ makes incidence to the magnification control element 12a as the TE-polarized light. This light transmits through the wave plate 14j and converted from the TE-polarized light into the TM-polarized light to make incidence to the diffraction lens 17b. Thus, it is almost entirely diffracted as the 1st-order diffracted light in the diffraction lens 17b and converted from the convergent light with an appropriate spread angle into the parallel light. This light transmits through the wave plate 14k and converted from the TM-polarized light into the TE-polarized light to be emitted from the magnification control element 12a as the TE-polarized light. The directions and the cycles of the saw-tooth of the diffraction lens 17b are so determined that the convergent light with an appropriate spread angle can be converted into the parallel light. The depth of the saw-tooth of the diffraction lens 17b is so determined that the diffraction efficiency of the 1st-order diffracted light becomes the maximum.

In the embodiment, the direction of the TM-polarized light in the magnification control element 11a is matched with the direction of the P-polarized light in the polarizing beam splitter 4, and the direction of the TE-polarized light in the magnification control element 12a is matched with the direction of the S-polarized light in the polarizing beam splitter 4. Thereby, loss of the light quantities in the inward light and outward light can be suppressed so that the efficiency becomes high.

The functions of the wave plates 14h, 14i, 14j, 14k in the magnification control elements 11a, 12a used in the embodiment may not necessarily be the ones described in FIG. 17, as long as the polarization directions of the light $P_D$ and the light $P_C$ making incidence to the magnification control elements 11a, 12a are consistent, the polarization directions of the light $P_D$ and the light $P_C$ making incidence to the diffraction lenses 17a, 17b are orthogonal to each other, and the polarization directions of the light $P_D$ and the light $P_C$ emitted from the magnification control elements 11a, 11b are consistent, as in the case of the wave plates 14a, 14b, 14c of the first embodiment.

Further, the functions of the diffraction lenses 17a, 17b in the magnification control elements 11a, 12a used in the embodiment may not necessarily be the ones as described in FIG. 17, as long as the diffraction lenses 17a, 17b almost entirely diffracts either the light $P_D$ or the light $P_C$ as the 1st-order diffracted light and almost entirely transmits the other light like the diffraction grating 16a of the third embodiment.

In a sixth embodiment of the optical head device of the present invention, a magnification control element 11b is provided between the diffractive optical element 3b and the polarizing beam splitter 4 of the second embodiment, a magnification control element 12b between the polarizing beam splitter 4 and the cylindrical lens 8, and an aperture control element 13b between the quarter-wave plate 5 and the objective lens 6, respectively. The position of the magnification control element 11b may be anywhere between the semiconductor laser 1b and the polarizing beam splitter 4, the position of the magnification control element 12b may be anywhere between the polarizing beam splitter 4a and the photodetector 10b, and the position of the aperture control element 13b may be anywhere between the polarizing beam splitter 4 and the objective lens 6.

Generally, the objective lens used for the optical head device is so designed that the spherical aberration is corrected for a specific wavelength and a thickness of a protection layer of a specific optical recording medium. Thus, the spherical aberration is generated for other wavelengths or other thicknesses of the protection layer of the optical recording medium. Therefore, in order to perform recording and reproduction to/from any of the optical recording medium of HD DVD standard, DVD standard and CD standard, it is necessary to correct the spherical aberration according to the type of the optical recording medium.

The objective lens 6 is so designed that the spherical aberration is corrected when the light $P_H$ making incidence to the objective lens 6 as the parallel light transmits through the protection layer of the optical recording medium of HD DVD standard. At the time of recording or reproducing to/from the optical recording medium of HD DVD standard, the magnification of the objective lens 6 is controlled by the magnification control elements 11b, 12b so that the light $P_H$ which is emitted from the semiconductor laser 1b and makes incidence to the magnification control element 11b as the parallel light is emitted from the magnification control element 11b as the parallel light and makes incidence to the objective lens 6, and the light $P_H$ which is emitted from the objective lens 6 and makes incidence to the magnification control element 12b as the parallel light is emitted from the magnification control element 12b as the parallel light and makes incidence to the light-sensing detector 10b.

When the light $P_D$ making incidence to the objective lens 6 as the parallel light transmits through the protection layer of the optical recording medium of DVD standard, the spherical aberration remains. However, if the light $P_D$ is made incidence to the objective lens 6 as divergent light with an appropriate spread angle, additional spherical aberration is generated due to the change in the magnification of the objective lens 6 thereby correcting the residual spherical aberration. At the time of recording or reproducing to/from the optical recording medium of DVD standard, the magnification of the objective lens 6 is controlled by the magnification control elements 11b, 12b so that the light $P_D$ which is emitted from the semiconductor laser 1b and makes incidence to the magnification control element 11b as the parallel light is emitted from the magnification control element 11b as the divergent light with an appropriate spread angle and makes incidence to the objective lens 6, and the light $P_D$ which is emitted from the objective lens 6 and makes incidence to the magnification control element 12b as the convergent light with an appropriate spread angle is emitted from the magnification control element 12b as the parallel light and makes incidence to the light-sensing detector 10b.

When the light $P_C$ making incidence to the objective lens 6 as the parallel light transmits through the protection layer of the optical recording medium of CD standard, the spherical aberration remains. However, if the light $P_C$ is made incidence to the objective lens 6 as divergent light with an appropriate spread angle, additional spherical aberration is generated due to the change in the magnification of the objective lens 6 thereby correcting the remaining spherical aberration. At the time of recording or reproducing to/from the optical recording medium of CD standard, the magnification of the objective lens 6 is controlled by the magnification control elements 11b, 12b so that the light $P_C$ which is emitted from the semiconductor laser 1b and makes incidence to the magnification control element 11b as the parallel light is emitted from the magnification control element 11b as the divergent light with an appropriate spread angle and makes incidence to the objective lens 6, and the light $P_C$ which is emitted from the objective lens 6 and makes incidence to the magnification control element 12b as the convergent light with an appropriate spread angle is emitted from the magnification control element 12b as the parallel light and makes incidence to the light-sensing detector 10b.

FIG. 7 and FIG. 8 are cross sections of the magnification control elements 11b and 12b. The magnification control element 11b has a structure in which a wave plate 14l, a diffraction lens 17c, a wave plate 14m, a diffraction lens 17d and a wave plate 14n are laminated. Further, the magnification control element 12b has a structure in which a wave plate 14o, a diffraction lens 17e, and a wave plate 14p, a diffraction lens 17f, and a wave plate 14q are laminated. For the wave plates 14l, 14m, 14n, 14o, 14p and 14q, crystals having a birefringent characteristic can be used or it is also possible to use ones in which liquid crystal high polymer or the like having the birefringent characteristic is sandwiched by glass substrates. For the diffraction lenses 17c, 17d, 17e, 17f, it is possible to use the one obtained by forming a pattern of the liquid crystal high polymer or the like having the birefringent characteristic on one of the wave plates 14l, 14m, 14n, 14o, 14p and 14q and then filled with filler. It is also possible to use the one obtained by forming a pattern of the liquid crystal high polymer or the like having the birefringent characteristic on a glass substrate and then filled with filler. The plane shape of the pattern of the liquid crystal high polymer or the like is in a concentric circular form at the intervals narrowing from the center towards the periphery and the cross section is in a saw-tooth shape. The wave plate 14l, the diffraction lens 17c, the wave plate 14m, the diffraction lens 17d and the wave plate 14n are integrated with an adhesive provided in between as necessary. Also, the wave plate 14o, the diffraction lens 17e, the wave plate 14p, the diffraction lens 17f, and the wave plate 14q are integrated with an adhesive provided in between as necessary.

The wave plate 14l functions as a full wave plate for the light $P_H$ and the light $P_C$ and functions as the half-wave plates for the light $P_D$ for converting the polarization direction of the incident light by 90°. The wave plate 14m function as the full wave plate for the light $P_H$ and functions as the half-wave plates for the light $P_D$ and the light $P_C$ for converting the polarization direction of the incident light by 90°. The wave plate 14n functions as a full wave plate for the light $P_H$ and the light $P_D$ and functions as the half-wave plates for the light $P_C$ for converting the polarization direction of the incident light by 90°. The wave plate 14o functions as the half-wave plate for the light $P_H$ and the light $P_D$ for converting the polarization direction of the incident light by 90° and function as the full wave plate for the light $P_C$. The wave plate 14p functions as the full wave plate for the light $P_H$ and functions as the half-wave plates for the light $P_D$ and the light $P_C$ for converting the polarization direction of the incident light by 90°. The wave plate 14q functions as the half-wave plate for the light $P_H$ and the light $P_C$ for converting the polarization direction of the incident light by 90° and function as the full wave plate for the light $P_D$.

The linearly polarized light whose polarization direction is vertical to the face of the page of the drawing is TE-polarized light, and the linearly polarized light whose polarization direction is parallel to the face of the page of the drawing is TM-polarized light. At this time, the refractive index of the liquid crystal high polymer or the like in the diffraction lenses 17c, 17d, 17e, 17f is different from the refractive index of the filler for the TE-polarized light and is the same as the refractive index of the filler for the TM-polarized light. That is, the diffraction lenses 17c, 17d, 17e and 17f function as the diffraction lenses for only the TE-polarized light.

FIG. 7(*a*) shows the light $P_H$ for HD DVD. The light $P_H$ makes incidence to the magnification control element 11b as the TM-polarized light. This light as the TM-polarized light transmits through the wave plate 14l as it is and makes incidence to the diffraction lens 17c. Thus, the light transmits through the diffraction lens 17c almost entirely and is kept in the parallel light. This light as the TM-polarized light transmits through the wave plate 14m as it is and makes incidence to the diffraction lens 17d. Thus, the light transmits through the diffraction lens 17d almost entirely and is kept in the parallel light. This light as the TM-polarized light transmits through the wave plate 14n as it is and emitted from the magnification control element 11b as the TM-polarized light.

FIG. 7(*b*) shows the light $P_D$ for DVD. The light $P_D$ makes incidence to the magnification control element 11b as the TM-polarized light. This light transmits through the wave plate 14l and converted from the TM-polarized light into the TE-polarized light to make incidence to the diffraction lens 17c. Thus, it is almost entirely diffracted as the 1st-order diffracted light in the diffraction lens 17c and converted from the parallel light into the divergent light with an appropriate spread angle. This light transmits through the wave plate 14m and converted from the TE-polarized light into the TM-polarized light to make incidence to the diffraction lens 17d. Thus, the light transmits through the diffraction lens 17d almost entirely and is kept in the divergent light. This light as the TM-polarized light transmits through the wave plate 14n as it is and emitted from the magnification control element 11b as the TM-polarized light. The directions and the cycles of the saw-tooth of the diffraction lens 17c are so determined that the parallel light is converted into the divergent light with an appropriate spread angle. The depth of the saw-tooth of the diffraction lens 17c is so determined that the diffraction efficiency of the 1st-order diffracted light becomes the maximum.

FIG. 7(*c*) shows the light $P_C$ for CD. The light $P_C$ makes incidence to the magnification control element 11b as the TM-polarized light. This light as the TM-polarized light transmits through the wave plate 14*l* as it is and makes incidence to the diffraction lens 17*c*. Thus, the light transmits through the diffraction lens 17*c* almost entirely and is kept in the parallel light. This light transmits through the diffraction lens 17*c* almost entirely and is kept in the parallel light. This light transmits through the wave plate 14*m* and converted from the TM-polarized light into the TE-polarized light to make incidence to the diffraction lens 17*d*. Thus, it is diffracted almost entirely as the 1st-order diffracted light in the diffraction lens 17*d* and converted from the parallel light into the divergent light with an appropriate spread angle. This light transmits through the wave plate 14*n* and converted from the TE-polarized light into the TM-polarized light to be emitted from the magnification control element 11*b* as the TM-polarized light. The directions and the cycles of the saw-tooth of the diffraction lens 17*d* are so determined that the parallel light is converted into the divergent light with an appropriate spread angle. The depth of the saw-tooth of the diffraction lens 17*d* is so determined that the diffraction efficiency of the 1st-order diffracted light becomes the maximum.

FIG. 8(*d*) shows the light $P_H$ for HD DVD. The light $P_H$ makes incidence to the magnification control element 12*b* as the TE-polarized light. This light transmits through the wave plate 14*o* and converted from the TE-polarized light into the TM-polarized light to make incidence to the diffraction lens 17*e*. Thus, the light transmits through the diffraction lens 17*e* almost entirely and is kept in the parallel light. This light as the TM-polarized light transmits through the wave plate 14*p* as it is and makes incidence to the diffraction lens 17*f*. Thus, it transmits through the diffraction lens 17*f* almost entirely and is kept in the parallel light. This light transmits through the wave plate 14*q* and converted from the TM-polarized light into the TE-polarized light to be emitted from the magnification control element 12*b* as the TE-polarized light.

FIG. 8(*e*) shows the light $P_D$ for DVD. The light $P_D$ makes incidence to the magnification control element 12*b* as the TE-polarized light. This light transmits through the wave plate 14*o* and converted from the TE-polarized light into the TM-polarized light to make incidence to the diffraction lens 17*e*. Thus, the light transmits through the diffraction lens 17*e* almost entirely and is kept in the convergent light. This light transmits through the wave plate 14*p* and converted from the TM-polarized light into the TE-polarized light to make incidence to the diffraction lens 17*f*. Thus, it is diffracted almost entirely as the 1st-order diffracted light in the diffraction lens 17*f* and converted from the convergent light with an appropriate spread angle into the parallel light. This light as the TE-polarized light transmits through the wave plate 14*q* as it is and is emitted from the magnification control element 12*b* as the TE-polarized light. The directions and the cycles of the saw-tooth of the diffraction lens 17*f* are so determined that the convergent light with an appropriate spread angle is converted into the parallel light. The depth of the saw-tooth of the diffraction lens 17*f* is so determined that the diffraction efficiency of the 1st-order diffracted light becomes the maximum.

FIG. 8(*f*) shows the light $P_C$ for CD. The light $P_C$ makes incidence to the magnification control element 12*b* as the TE-polarized light. This light as the TE-polarized light transmits through the wave plate 14*o* as it is and makes incidence to the diffraction lens 17*e*. Thus, it is diffracted almost entirely as the 1st-order diffracted light in the diffraction lens 17*e* and converted from the convergent light with an appropriate spread angle into the parallel light. This light transmits through the wave plate 14*p* and converted from the TE-polarized light into the TM-polarized light to make incidence to the diffraction lens 17*f*. Thus, it transmits through the diffraction lens 17*f* almost entirely and is kept in the parallel light. This light transmits through the wave plate 14*q* and converted from the TM-polarized light into the TE-polarized light to be emitted from the magnification control element 12*b* as the TE-polarized light. The directions and the cycles of the saw-tooth of the diffraction lens 17*e* are so determined that the convergent light with an appropriate spread angle is converted into the parallel light. The depth of the saw-tooth of the diffraction lens 17*e* is so determined that the diffraction efficiency of the 1st-order diffracted light becomes the maximum.

In the embodiment, the direction of the TM-polarized light in the magnification control element 11*b* is matched with the direction of the P-polarized light in the polarizing beam splitter 4, and the direction of the TE-polarized light in the magnification control element 12*b* is matched with the direction of the S-polarized light in the polarizing beam splitter 4. Thereby, loss of the light quantities in the inward light and outward light can be suppressed so that the efficiency becomes high.

The functions of the wave plates 14*l*, 14*m*, 14*n*, 14*o*, 14*p*, 14*q* in the magnification control elements 11*b*, 12*b* used in the embodiment may not necessarily be the ones described in FIG. 7 and FIG. 8, as long as: the polarization directions of the light $P_H$, the light $P_D$ and the light $P_C$ making incidence to the magnification control elements 11*b*, 12*b* are consistent; the polarization direction of one of the light $P_H$, the light $P_D$ and the light $P_C$ making incidence to the diffraction lenses 17*c*, 17*e* is orthogonal to the polarization direction of other two light beams; the polarization direction of the light among the light $P_H$, the light $P_D$ and the light $P_C$ making incidence to the diffraction lenses 17*d*, 17*f* (except for the one whose polarization direction is different from that of the other two light beams in the diffraction lenses 17*c*, 17*e*) is orthogonal to that of the other two light beams; and the polarization directions of the light $P_H$, the light $P_D$ and the light $P_C$ emitted from the magnification control elements 11*b*, 12*b* are consistent, as in the case of the wave plates 14*d*, 14*e*, 14*f*, 14*g* of the second embodiment.

Further, the functions of the diffraction lenses 17*c*, 17*d*, 17*e*, 17*f* in the magnification control elements 11*b*, 12*b* used in the embodiment may not necessarily be the ones as described in FIG. 7 and FIG. 8, as long as: the diffraction lenses 17*c*, 17*e* almost entirely diffracts one of the light $P_H$, the light $P_D$ or the light $P_C$ as the 1st-order diffracted light and almost entirely transmits other two light beams; and the diffraction lenses 17*d*, 17*f* almost entirely diffracts one of the light among the light $P_H$, the light $P_D$ and the light $P_C$ (except for the one which is diffracted in the diffraction lenses 17*c*, 17*e*) as the 1st-order diffracted light and transmits the other two light beams almost entirely, as in the case of the diffraction gratings 16*b*, 16*c* of the fourth embodiment.

In a seventh embodiment of the optical head device of the present invention, the diffractive optical element 3*a* and the magnification control element 11*a* of the fifth embodiment are replaced with a diffractive optical element 3*e*.

FIG. 9 is a cross section of the diffractive optical element 3*e*. The diffractive optical element 3*e* has a structure in which a diffraction lens 17*a* is inserted between the diffraction grating 15*b* and the wave plate 14*c* of the diffractive optical element 3*c* shown in FIG. 13. The function of the diffraction lens 17*a* is the same as that of the magnification control element 11*a* as shown in FIG. 12. For the diffraction lens 17*a*, it is possible to use the one obtained by forming a pattern of the liquid crystal high polymer or the like having the birefringent characteristic on the wave plate 14*c*, and then filled with filler. It is also possible to use the one obtained by forming a pattern of the liquid crystal high polymer or the like having the birefringent characteristic on a glass substrate and then filled with filler. The order of the diffraction grating 16a, the diffraction grating 15b and the diffraction lens 17a can be determined at will. The diffractive optical element 3e has the optical axis correcting function of the diffractive optical element 3c shown in FIG. 6 and the magnification control function for the objective lens 6, which is the function of the magnification control element 11a shown in FIG. 12.

In an eighth embodiment of the optical head device according to the present invention, the diffractive optical element 3b and the magnification control element 11b of the sixth embodiment are replaced with a diffractive optical element 3f.

FIG. 9 is a cross section of the diffractive optical element 3f. The diffractive optical element 3f has a structure in which a diffraction lens 17c is inserted between the diffraction grating 15c and the wave plate 14e of the diffractive optical element 3d shown in FIG. 14, and a diffraction lens 17d is inserted between the diffraction grating 15e and the wave plate 14g. The functions of the diffraction lenses 17c and 17d are the same as that of the magnification control element 11b as shown in FIG. 13 and FIG. 14. For the diffraction lenses 17c, 17d, it is possible to use the one obtained by forming a pattern of the liquid crystal high polymer or the like having the birefringent characteristic on the wave plates 14e, 14g, and then filled with filler. It is also possible to use the one obtained by forming a pattern of the liquid crystal high polymer or the like having the birefringent characteristic on a glass substrate and then filled with filler. The order of the diffraction grating 16b, the diffraction grating 15c and the diffraction lens 17c can be determined at will, and the order of the diffraction grating 16c, the diffraction grating 15e and the diffraction lens 17d can be determined at will. The diffractive optical element 3f has the optical axis correcting function of the diffractive optical element 3d shown in FIG. 14 and the magnification control function for the objective lens 6, which is the function of the magnification control element 11b shown in FIG. 7.

Next, an aperture control element 13a of the fifth embodiment will be described. In order to perform recording and reproduction to/from the optical recording medium of both DVD standard and CD standard, it is necessary to control the numerical aperture of the objective lens in the optical head device in accordance with the type of the optical recording medium. The aperture control element 13a is provided for that purpose.

FIG. 10 is a plan view of the aperture control element 13a. The aperture control element 13a has a structure in which a dielectric multilayer film is formed on a glass substrate, which is divided into two regions of 18a and 18b. The dotted line in the drawing corresponds to an effective diameter of the objective lens 6. The region 18a almost entirely transmits the light $P_D$ and the light $P_C$. The region 18b almost entirely transmits the light $P_D$ and almost entirely reflects the light $P_C$. Therefore, the numerical aperture for the light $P_D$ is determined according to the effective diameter of the objective lens 6 and is set to be 0.6, for example. The numerical aperture for the light $P_C$ is determined according to the diameter of a circle as the boundary of the regions 18a and 18b and is set to be 0.45, for example.

Next, an aperture control element 13b of the sixth embodiment will be described. In order to perform recording and reproduction to/from all the optical recording medium of HD DVD standard, DVD standard and CD standard, it is necessary to control the numerical aperture of the objective lens in the optical head device in accordance with the type of the optical recording medium. The aperture control element 13b is provided for that purpose.

FIG. 10 is a plan view of the aperture control element 13b. The aperture control element 13b has a structure in which a dielectric multilayer film is formed on a glass substrate, which is divided into three regions of 18c, 18d and 18e. The dotted line in the drawing corresponds to an effective diameter of the objective lens 6. The region 18c almost entirely transmits the light $P_H$, the light $P_D$ and the light $P_C$. The region 18d almost entirely transmits the light $P_H$ and the light $P_D$ and almost entirely reflects the light $P_C$. The region 18e almost entirely transmits the light $P_H$ and almost entirely reflects the light $P_D$ and the light $P_C$. Therefore, the numerical aperture for the light $P_H$ is determined according to the effective diameter of the objective lens 6 and is set to be 0.65, for example. The numerical aperture for the light $P_D$ is determined according to the diameter of the circle as the boundary of the regions 18d and 18e and is set to be 0.6, for example. The numerical aperture for the light $P_C$ is determined according to the diameter of the circle as the boundary of the regions 18c and 18d and is set to be 0.45, for example.

Figure 11:
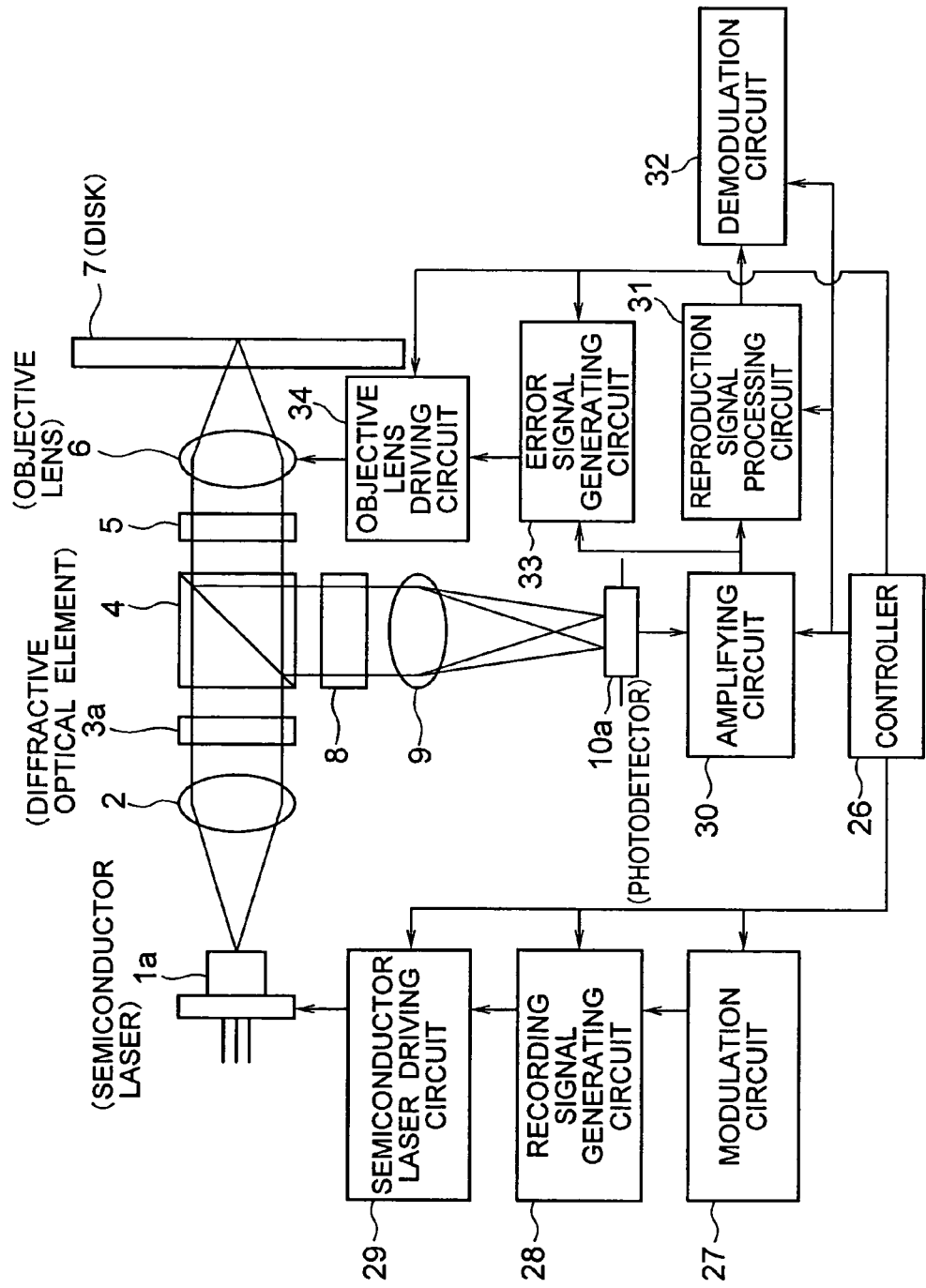
FIG. 11 is an illustration for showing an embodiment of an optical information recording or reproducing device of the present invention.

FIG. 11 shows an embodiment of an optical information recording or reproducing device according to the present invention. This embodiment is formed by additionally providing, to the first embodiment of the optical head device of the present invention, a controller 26, a modulation circuit 27, a recording signal generating circuit 28, a semiconductor laser driving circuit 29, an amplifying circuit 30, a reproduction signal processing circuit 31, a demodulation circuit 32, an error signal generating circuit 33, and an objective lens driving circuit 34.

The modulation circuit 27 modulates the data to be recorded to the disk 7 according to a modulation rule. The recording signal generating circuit 28 generates a recording signal for driving the semiconductor laser 1a according to a recording strategy based on the signal modulated by the modulation circuit 27. Based on the recording signal generated by the recording signal generating circuit 28, the semiconductor laser driving circuit 29 supplies electric current to the semiconductor laser 1a according to the recording signal for driving the semiconductor laser 1a. Thereby, the data is recorded to the disk 7.

In the meantime, the amplifying circuit 30 amplifies the output from each light receiving section of the photodetector 10a. The reproduction signal processing circuit 31 performs generation of an RF signal, waveform equalization, and binarization based on the signal amplified by the amplifying circuit 30. The demodulation circuit 32 demodulates the signal binarized in the reproduction signal processing circuit 31 according to a demodulation rule. Thereby, the data is reproduced from the disk 7.

Further, the error signal generating circuit 33 generates a focus error signal and a track error signal based on the signal amplified by the amplifying circuit 30. Based on the error signal generated in the error signal generating circuit 33, the objective lens driving circuit 34 supplies electric current according to the error signal to an actuator (not shown), which drives the objective lens 6, so as to drive the objective lens 6.

Furthermore, the optical system except for the disk 7 is driven by a positioner (not shown) in a radial direction of the disk 7, and the disk 7 is rotationally driven by a spindle (not shown). Thereby, servo-control of the focus, track, positioner and spindle is performed.

The controller 26 controls the circuit from the modulation circuit 27 to the semiconductor laser driving circuit 29 associated with recording of data, the circuit from the amplifying circuit 30 to the demodulation circuit 32 associated with reproduction of data, and the circuit from the amplifying circuit 30 to the objective lens driving circuit 34 associated with the servo-control.

This embodiment is the recording or reproducing device which performs recording and reproduction to/from the disk 7. Meanwhile, a reproduction-only device which exclusively performs reproduction from the disk 7 is also possible as an embodiment of the optical information recording or reproducing device of the present invention. In that case, the semiconductor laser 1a is not driven by the semiconductor laser driving circuit 29 based on the recording signal but is driven in such a manner that power of the emitted light becomes a constant value.

As another embodiment of the optical information recording or reproducing device of the present invention, such a form is possible in which the controller 26, the modulation circuit 27, the recording signal generating circuit 28, the semiconductor laser driving circuit 29, the amplifying circuit 30, the reproduction signal processing circuit 31, the demodulation circuit 32, the error signal generating circuit 33, and the objective lens driving circuit 34 are additionally provided to one of the second to eighth embodiments of the optical head device according to the present invention.

What is claimed is:

1. An optical head device, comprising:
   a plural-wavelength light source capable of selectively emitting a single light beam among a plurality of light beams of different wavelengths;
   an objective lens for focusing emitted light from the plural-wavelength light source onto an optical recording medium;
   a photodetector for receiving reflected light from the optical recording medium;
   a light separating element for separating the emitted light from the plural-wavelength light source and the reflected light from the optical recording medium; and
   a diffractive optical element provided between the plural-wavelength light source and the light separating element, the diffractive optical element branching the emitted light from the plural-wavelength light source into a plurality of light beams;
   a first magnification control element provided between the plural-wavelength light source and the light separating element so as to alter magnification of the objective lens in an outward path in accordance with a wavelength of incident light; and
   a second magnification control element provided between the light separating element and the photodetector so as to alter magnification of the objective lens in an inward path in accordance with a wavelength of incident light, wherein
   the light separating element includes a polarizing beam splitter which guides the emitted light from the diffractive optical element to the optical recording medium and also guides the reflected light from the optical recording medium to the photodetector, and
   among a plurality of the light beams of different wavelengths making incidence to the polarizing beam splitter, at least two light beams are linearly polarized light with a same polarization direction.

2. The optical head device according to claim 1, wherein each of the first magnification control element and the second magnification control element has a structure in which a plurality of wave plates and a diffraction lens are laminated.

3. The optical head device according to claim 2, wherein, among the plurality of light beams of different wavelengths making incidence to the diffraction lens, a polarization direction of one of the light beams is orthogonal to a polarization direction of other light beams.

4. The optical head device according to claim 3, wherein the diffraction lens gives a lens effect to the one light beam by diffraction and transmits the other light beams.

5. The optical head device according to claim 2, wherein the diffraction lens contains a material having a birefringent characteristic.

6. The optical head device according to claim 1, wherein the diffractive optical clement and the first magnification control element are unified.

* * * * *